United States Patent [19]
Williams

[11] Patent Number: 5,593,109
[45] Date of Patent: Jan. 14, 1997

[54] ACTUATOR SYSTEM AND METHOD

[75] Inventor: Andrew S. Williams, Brea, Calif.

[73] Assignee: Lucas Western, Inc., Brea, Calif.

[21] Appl. No.: 370,792

[22] Filed: Jan. 10, 1995

[51] Int. Cl.⁶ .................................................. F42B 10/64
[52] U.S. Cl. ........................................ 244/3.21; 244/3.28
[58] Field of Search .................................. 244/3.21, 3.24, 244/3.27, 3.28, 3.29, 76 A; 318/432, 433

[56] References Cited

U.S. PATENT DOCUMENTS

| | | | |
|---|---|---|---|
| 2,487,793 | 11/1949 | Esval et al. | |
| 2,909,764 | 10/1959 | Chambers . | |
| 2,924,401 | 2/1960 | Goss et al. . | |
| 3,156,436 | 11/1964 | White | 244/3.21 |
| 3,521,535 | 7/1970 | Oelrich | 91/47 |
| 3,946,968 | 3/1976 | Stallard | 244/3.21 |
| 4,033,525 | 7/1977 | Leonard et al. | 244/3.15 |
| 4,156,835 | 5/1979 | Whitney et al. | 318/561 |
| 4,191,347 | 3/1980 | Fueyo | 244/76 A |
| 4,234,142 | 11/1980 | Yost et al. | 244/3.21 |
| 4,370,706 | 1/1983 | Doniger et al. | 364/184 |
| 4,481,586 | 11/1984 | Skutecki | 364/434 |
| 4,575,027 | 3/1986 | Cronin | 244/75 R |
| 4,595,158 | 6/1986 | Robinson | 244/75 R |
| 4,628,455 | 12/1986 | Skutecki | 364/434 |
| 4,698,569 | 10/1987 | Kimura et al. | 318/567 |
| 4,725,020 | 2/1988 | Whitener | 244/76 R |
| 4,800,721 | 1/1989 | Cemenska et al. | 60/393 |
| 4,904,999 | 2/1990 | Klansnic et al. | 340/945 |
| 5,088,658 | 2/1992 | Forsmo | 244/3.21 |
| 5,209,661 | 5/1993 | Hildreth et al. | 434/45 |
| 5,439,188 | 8/1995 | Depew, Jr. et al. | 244/3.21 |
| 5,442,268 | 8/1995 | Goodarzi et al. | 318/432 |

*Primary Examiner*—Michael J. Carone
*Assistant Examiner*—Christopher K. Montgomery
*Attorney, Agent, or Firm*—Pretty, Schroeder, Brueggemann & Clark

[57] ABSTRACT

An actuator receives an input torque command and rotates an aeronautical surface within a prescribed range of motion. An output shaft is rigidly secured to the aeronautical surface, such that axial rotation of the output shaft results in displacement of the aeronautical surface. A drive motor controls rotation of the output shaft by applying a motive force thereto. A drive circuit controls the drive motor, to thereby control axial rotation of the output shaft, in response to keep input torque command. A torque sensor is operatively coupled to the drive shaft. The torque sensor measures output shaft rotational torque and provides an electronic representation of the output shaft rotational torque to the drive circuit. The drive circuit receives the electronic representation as a torque command feedback signal, and derives a torque error command as the difference between the input torque command and the output shaft rotational torque. When the aeronautical surface is within the range of motion, the drive circuit rotates the output shaft to compensate for the torque error command. When the aeronautical surface is not within the range of motion, the drive circuit rotates the output shaft to compensate for the torque error command only if the rotation moves the aeronautical surface closer to within the range of motion. This system may be applied of missiles or other aircraft. A separate actuator can be applied to each missile fin.

36 Claims, 15 Drawing Sheets

| FIG. 5C(a) | FIG. 5C(b) | FIG. 5C(c) |
| FIG. 5C(d) | FIG. 5C(e) | FIG. 5C(f) |

ACTUATOR SYSTEM AND METHOD

The present invention relates to an actuator system and a method of guiding an aeronautical surface. More particularly, the present invention provides a missile fin actuator that uses an input torque command and a rotational torque feedback signal to actively guide a missile. The present invention also provides an actuator which has electronic overdrive protection.

BACKGROUND

In the field of automated control, two types of general systems are common. First, open-loop systems can be used to move a mechanical element with a predetermined action or command. These open-loop systems do not use feedback, and hence do not inherently compensate for how well the mechanical element responds to the command. Second, closed-loop systems are used to implement feedback, and thereby adjust drive of the mechanical element so that it accurately implements the command. One example of a closed-loop system is steering of a car; a heading is chosen for the car and the steering wheel is turned until, using his eyesight, a driver determines that the car has the approximate heading desired. If the driver turns the car too much, and it moves past the desired heading, eyesight informs the driver that the steering wheel must be turned back in the opposite direction to correct the car's heading. Thus, the driver may not know precisely the car's direction in degrees, but the driver uses feedback provided by his own eyes to steer the car in the desired direction. Closed-loop systems are generally more accurate than open loop systems, because they inherently compensate for mechanical inaccuracies.

Closed-loop systems are commonly used to control aeronautical surfaces, such as missile fins. Typically this is done by sensing the direction, or angle at which the fin is inclined, comparing that angle with the angle the fin is supposed to have, and producing an error signal as a result. This error signal is used to further steer the fin.

Although commonly used in some missile guidance systems, position feedback has sometimes proven inadequate. For example, missiles sometimes have four fins, grouped into two symmetrical pairs that form the shape of a cross around the missile. That is to say, some missiles use two pairs of fins, each fin oriented 90° apart. Oftentimes, the motion of the missile and its own body effectively impose differing forces upon each fin of the missile. Even though one symmetric pair of fins may be horizontal, for example, each fin in that pair might experience different forces. Consequently, position feedback, which is generally used to commonly drive one symmetric pair of missile fins at the same time, may be imprecise, as one of the two fins in the pair can affect the missile's path more than the other fin in the pair. This can cause unwanted roll, yaw or pitch.

In the past, some attempts have also been made to investigate torque-controlled actuators, that is, an actuator which tells its mechanical element how hard and fast to move, rather than by how much. However, in the context of missile guidance systems, it is difficult with such designs to control the excursion of the missile fin past predetermined points. It is usually desired to rotate the missile fin only within a ±30° range, to prevent excessive missile fin rotation from causing the missile to stall or otherwise move counterproductively. Torque-control has typically not been used for active guidance of a missile, and typically has been used only in limited circumstances. For example, one known design measures differential pressures on either side of a fin surface, to feather the corresponding symmetric fin pair to a null position during the booster stage of a missile or rocket. However, position feedback is then relied upon during later, active guidance of the missile or rocket.

There has existed a definite need for a torque feedback actuator that can be used for active guidance of an aeronautical surface. What is needed is a torque feedback system that can be used to modify an input torque command, so that the surface does not cause unwanted yaw, pitch and roll. Further, there has existed a need for an actuator that electronically prevents excessive excursion of the surface outside of a predetermined range, and preferably does so in the context of torque feedback. The present invention solves these needs and provides further, related advantages.

SUMMARY OF THE INVENTION

The present invention solves the foregoing needs by providing a torque feedback actuator system that can be used in active guidance of an aeronautical surface. To this effect, the system operates upon an input torque command and compensates a drive motor for error in the command's implementation, using sensed rotational torque in an output shaft. In the context of a missile fin actuator, each steering fin of the missile can have a torque sensor that continually measures the amount of rotational strain that the missile fin experiences. This is then fed back to an electronic drive circuit, and used to modify the motor drive for the fin. The present invention thus provides a device that helps eliminate unwanted roll, yaw and pitch of the missile. The present invention also provides an actuator system having an electronic limiter that limits excursion of an output shaft by electronically limiting the drive for that shaft. In the case of missile fin control, this actuator helps prevent excursion of the missile fin outside of a ±b 30° range, which is particularly useful if movement of the steering fin is commanded by a torque signal. The present invention therefore provides an actuator system and guidance method for a missile that simplifies missile fin control in many respects.

In accordance with the present invention, one form of the invention is an actuator system that implements torque feedback. This form of the invention controls an aeronautical surface, e.g., a missile fin, using a rotatable output shaft, and a drive motor and circuit that rotate the shaft in accordance with a torque command. This form of the invention also includes a torque sensor that directly measures rotational torque actually felt by the output shaft. The torque sensor provides an electronic representation of sensed rotational torque back to the electronic drive circuit, which further drives the output shaft as necessary. Preferably, a missile guidance system includes four steering fins and one feedback system for each fin, such that if different fins of the missile experience different torques, movement of those fins may be separately controlled to apply only so much lift as is necessary to correctly guide the missile.

A second form of the invention provides an actuator system that controls movement of an aeronautical surface. More particularly, this second form of the invention utilizes a sensor of one of movement and rotation of the aeronautical surface, and an electronic limiter. The limiter receives the position or movement of the surface from the sensor, and also receives an input command that controls the surface. In response to these signals, the limiter regulates application of rotary power to preferably keep the surface within a predetermined limit. For example, the limit may be chosen to be +30°, and the sensor may be a position sensor that indicates the angle held by a missile fin.

Unlike conventional missile fin actuator designs, the preferred embodiment does not implement position feedback, and it only uses fin position to compare angle of the missile fin with its positional limit. That is, fin position sensing is preferably used only for purposes of the electronic limiter, and not for guidance of the missile.

The second form of the invention can advantageously use two limits, for example, +30° and −30°, and determine a rotational direction of the guidance signal. Ideally, the first and second forms of the invention are used together, such that the electronic limiter acts upon the torque error signal produced by feedback. However, irrespective of whether the first and second forms of the invention are used together, the rotational direction is compared with fin position, to make sure that the command signal does not cause the aeronautical surface to rotate in a direction that will place it further outside a range defined between the two limits. That is to say, the limiter passes the guidance (input) command to the missile fin, unless the fin is at or beyond the limit and the command also wants the fin to further rotate beyond the limit.

In a third form of the invention, a method for guiding an aeronautical surface is provided, which roughly utilizes the operations which have been described above. That is, this third form of the invention provides a method that uses a torque sensor to sense rotational torque in an output shaft, and a drive circuit that drives that shaft according to a torque command signal, after that signal has been error-compensated using the sensed rotational torque. Further, this third form of the invention can implement an electronic limiter, using position sensing, to measure whether the surface has exceeded its limit or limits.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIG. 1A shows the location of the drive electronics for the fins, in cut-away view.

FIG. 1B shows reduction gearing for each of the four missile fins, together with a unique drive shaft for each fin.

FIG. 3 also illustrates the placement of an alternative torque sensor in the system, namely, a diaphragm strain gauge, instead of the preferred torque sensor seen in FIGS. 4A and 4B.

FIG. 4A illustrates the preferred use of two strain gauges which are placed opposite each other on a cylindrical interior of the shaft.

FIG. 5(C)(a) is an upper left portion of the schematic of FIG. 5C.

FIG. 5(C)(b) is an upper middle portion of the schematic of FIG. 5C.

FIG. 5(C)(c) is an upper right portion of the schematic of FIG. 5C.

FIG. 5(C)(d) is a lower left portion of the schematic of FIG. 5C.

FIG. 5(C)(e) is a lower middle portion of the schematic of FIG. 5C.

FIG. 5(C)(f) is a lower right portion of the schematic of FIG. 5C.

DETAILED DESCRIPTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of an actuator system and method, namely, a missile fin actuator system that steers each of four steering fins of a missile. The invention, however, may also be applied to other types of actuator systems as well.

I. Introduction To The Principal Parts.

Figure 1A:
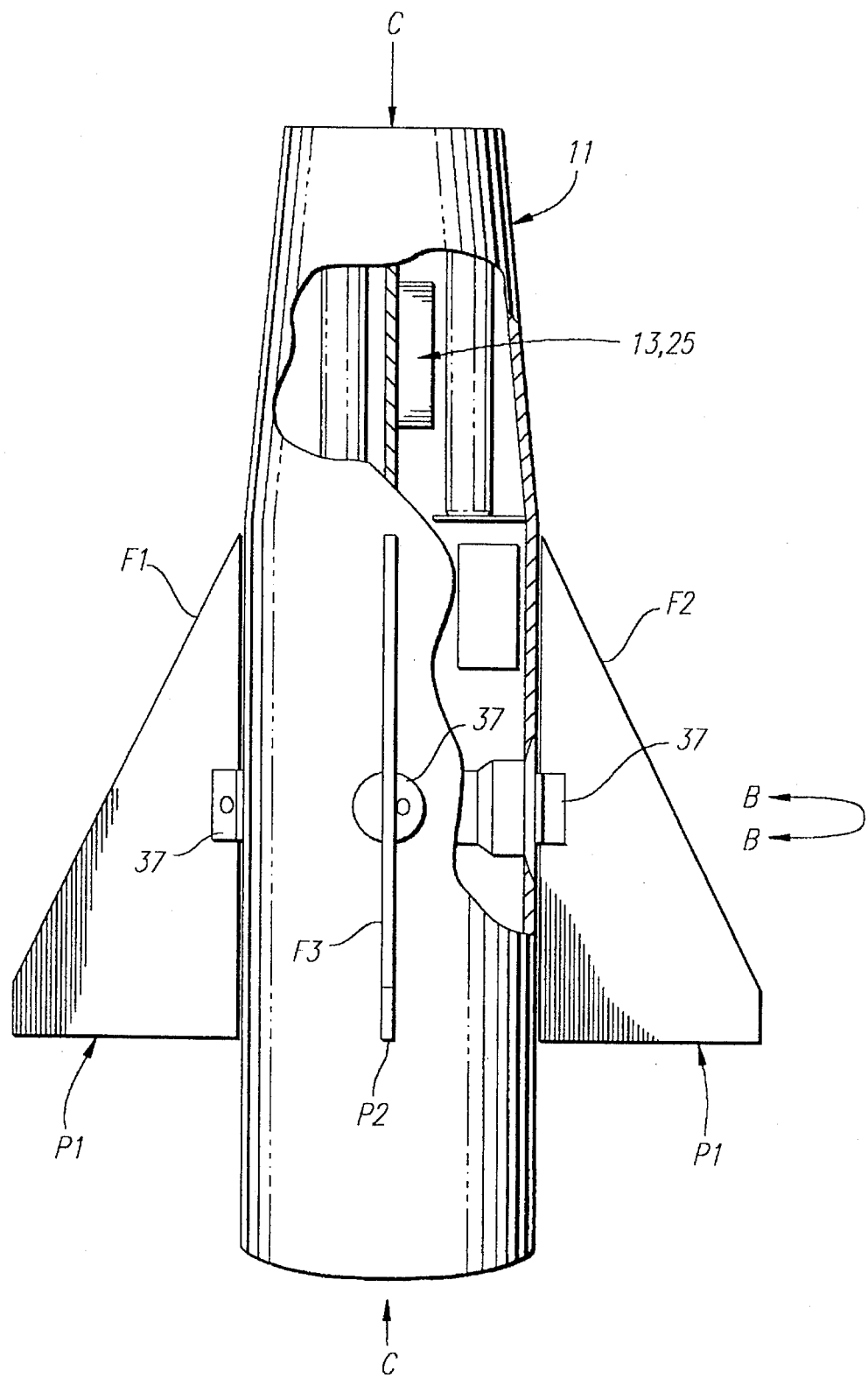
FIG. 1A is a perspective view of the middle section of a missile, including four missile fins that guide the missile.

The preferred embodiment is a missile fin actuator system. FIG. 1A shows a typical missile application, and illustrates the middle section 11 of a missile, without its nose or rocket. It is this middle section 11 that houses the tracking and control electronics 13 of the missile. The particular missile illustrated has four steering fins F1–F4, which rotate as commanded by a guidance control computer, to enable the missile to hone in upon its target under the force of its rocket (not shown). The four missile fins F1–F4 are arranged into two symmetric pairs P1 and P2 of fins, as is best illustrated in FIG. 1C. Each fin F1–F4 is 90° from its neighbor fins, with fins that are 180° apart forming each symmetric pair P1 and P2 of fins. The guidance control computer can be used to provide a torque command for rotation of each fin F1–F4 separately in accordance with known tracking algorithms, or it can also be used to provide one torque command for common rotation of each symmetric pair P1 and P2 of fins.

Figure 1B:
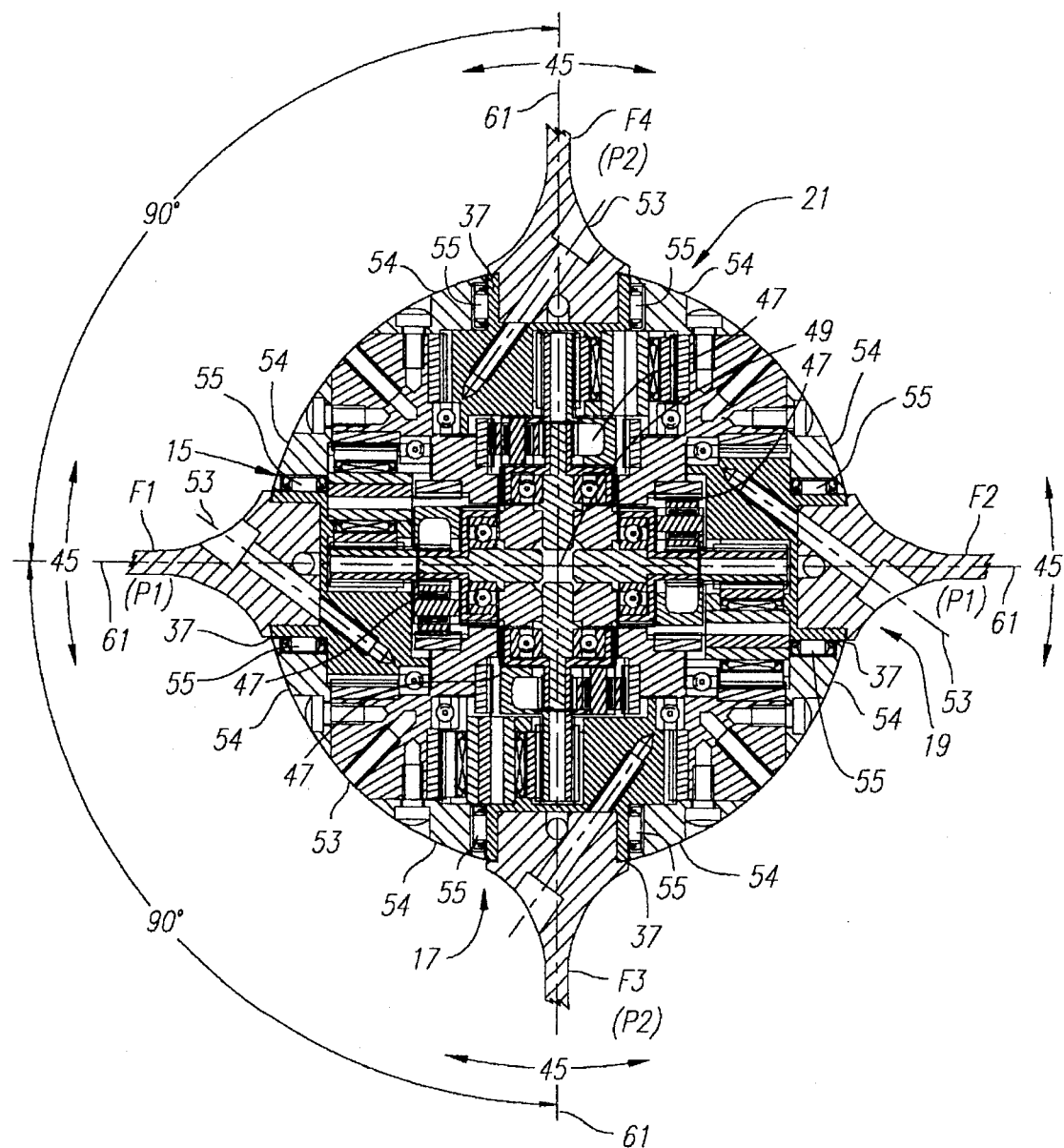
FIG. 1B is a horizontal, cross-sectional view of the missile of FIG. 1A, taken along line B—B of FIG. 1.
Figure 1C:
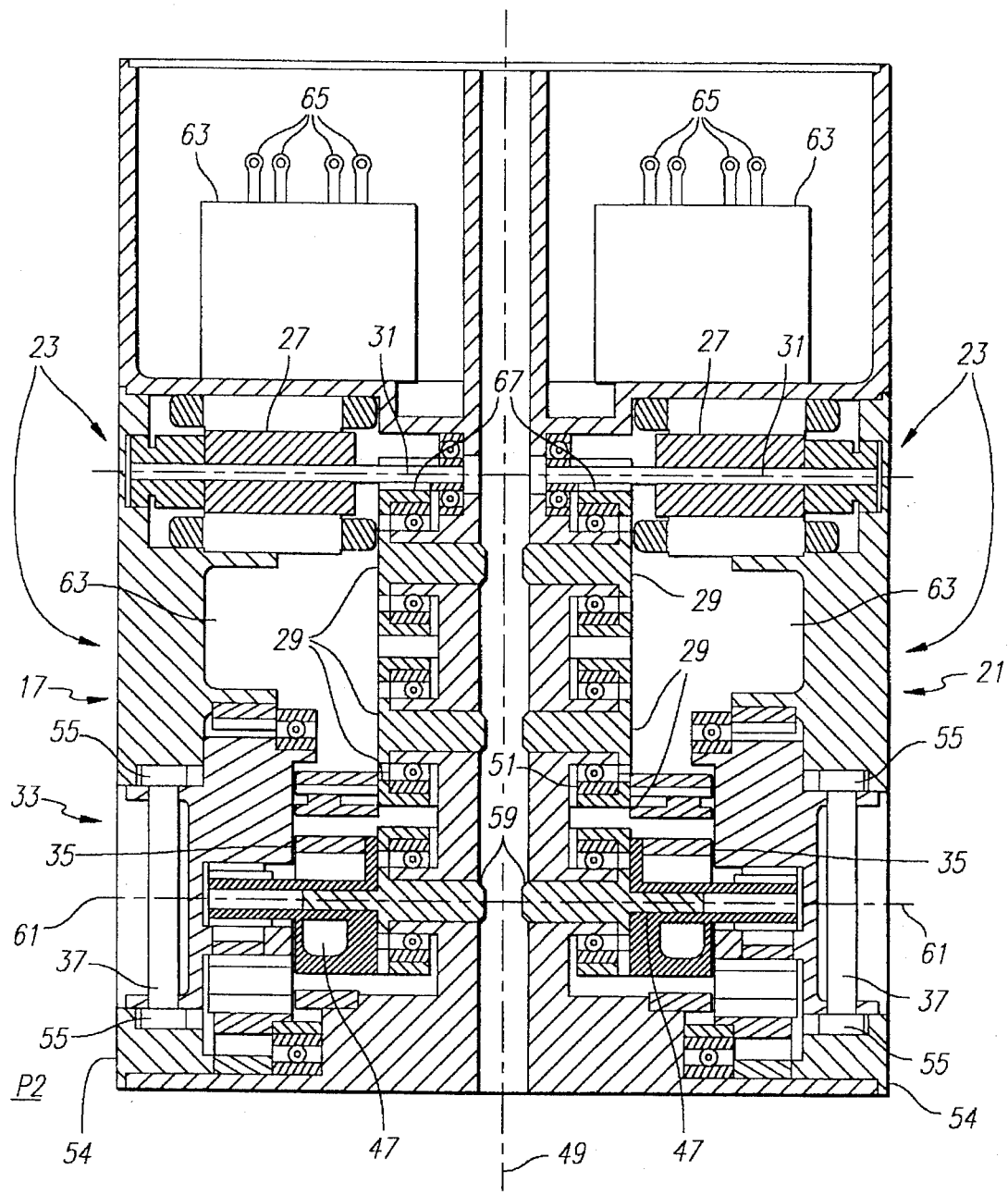
FIG. 1C is an axial cross-sectional view of the missile of FIG. 1A, taken along lines C—C of FIG. 1A.

FIGS. 1B and 1C illustrate the various parts of the actuator system, which generally includes four fin subsystems 15, 17, 19 and 21, i.e., a fin actuator for each of the steering fins F1–F4. Each of these subsystems 15, 17, 19 and 21 is identical in construction, and consists of an electromechanical section 23 and an electronics section 25, which will be explained in greater detail further below. Introduced briefly, however, each electromechanical section 23 includes a drive motor 27, a series 29 of idler spur gears that conveys motor power from a motor shaft 31 to the general area 33 of the fins F1–F4, a gear reduction 35 that increases force provided by the motor, and an output shaft 37 which rotates the fin F1, F2, F3 or F4. The electromechanical section 23 also includes a torque sensor 24 (not seen in FIGS. 1A–C), which measures torque felt by the output shaft 37, and a position sensor 38 (also not seen in FIGS. 1A–C) that indicates the fin's angular position. The electronics section 25 receives a torque command from the guidance computer (not shown), a torque feedback signal from the torque sensor 24, and a position signal from the position sensor 38, and uses these to control the corresponding fin F1, F2, F3 or F4. The electronics section 25 generally consists of three blocks (see FIGS. 5A–C), including an error (strain gauge) amplifier 39, an electronic overdrive circuit or electronic limiter 41, and a main drive circuit 43. These will be discussed further below.

A. Layout.

FIG. 1B shows a cross-sectional view of the missile, sliced horizontally across all four steering fin shafts 37, while FIG. 1C shows a side view of the middle section 11 of the missile. The missile is roughly divided vertically into quarters 45, each quarter housing the actuator 15, 17, 19 or 21 of a corresponding missile fin.

As seen in FIG. 1B, each quarter 45 of the missile has a planetary gear assembly 47 that receives torque and increases it before providing it to the output shaft 37 for the corresponding fin F1–F4. This force is received near a center axis 49 of the missile, at the location roughly designated by the reference numerals 51 in FIG. 1B, and is distributed to each output shaft 37. Each fin F1–F4 is connected to the missile by a high tensile strength bolt 53, which is sunk through the fin and fastens it securely to its output shaft 37. The output shaft 37 is retained securely by a bearing cap 54, and is allowed to rotate by virtue of needle roller bearings 55, which interact between the output shaft and the missile housing. The planetary gear assembly 47 structurally couples the output shaft 37 at a center axis 61 with a pin 59 at the center of the missile, one for each fin F1–F4.

As seen in FIG. 1C, each output shaft 37 rotates along a corresponding fin axis 61, and receives torque supplied by the drive motor 27, which is located vertically above each planetary gear assembly 47. The motor 27 receives its power from a 56 volt direct current ("d.c.") battery 63, which lies immediately adjacent the motor, and is oriented vertically. The battery has leads 65, which are clearly seen in FIG. 1C.

Each drive motor 27 has a motor shaft 31 that is fitted with a pinion 67 at its end, near the axis 49 of the missile. The pinion 67 interfaces with the series 29 of idler spur gears, which convey torque from each drive motor 27 to the corresponding planetary gear assembly 47 and output shaft 37.

In implementing the present invention, both the torque sensor 24 and the position sensor 38 are used at each fin's output shaft. These devices interface mechanically with the output shaft 37, and provide electronic signals which are carried to the control electronics 13 within grooves 56 that lie within the bearing cap 54. These electronics 13 generally include the electronics sections 25 for each fin actuator 15, 17, 19 and 21.

With the layout of the overall missile actuator system described, the operation of each individual actuator 15, 17, 19 or 21 will be described below.

II. The Electromechanical Section For Each Fin.

A. The Drive Motor.

As mentioned, each missile fin has its own electromechanical section 23, which is designed around a low inertia brushless dc motor 27. The motor 27 gets its power from a 56 volt dc battery (indicated positionally within the missile by FIG. 1C). Each brushless dc motor is turned using three motor stators 69, 71, and 73 (FIG. 5C), each receiving an appropriately timed, pulsed signal from the electronics section 25 corresponding to the fin F1, F2, F3 or F4. The timing of these three signals causes the motor 27 to produce rotation of the proper speed and direction. In addition to the three stators 69, 71 and 73, the motors 27 each have three Hall effect detectors HA, HB and HC, which are used to sense motor position. These detectors HA, HB and HC each produce a pulsed signal for each motor rotation, and are circumferentially distributed within the motor 27. Thus, three pulsed signals are also output by each motor to the electronics section 25, for use as a motor feedback signal in a standard brushless motor control loop.

The motor 27 is preferably chosen to have a maximum speed of 1800 radians/sec and a rated output of 37.50 ounces-per-inch, using a current of 8.93 amps. The motor is, however, chosen to have an intermittent peak output of 56.5 ounces-per-inch at 13.5 amps. This makes possible a peak stall torque at the output of over 600 in.lbs., using the gear reduction ratio of 207.7:1, and an efficiency factor of 85%.

Each motor 27 turns a motor shaft 31 that has a pinion 67 at its end, for the purpose of turning the mechanical drive, i.e., the series 29 of idler spur gears and the planetary gear assembly 47. The gears are chosen to provide the 207.7:1 reduction ratio, to thereby provide slower rotations than the motor to the missile fin, but with much greater torque. As is discussed below, the gear reduction is achieved principally by the planetary gear assembly 47, which conveys the motor's torque to the output shaft 37 corresponding missile fin F1, F2, F3 or F4.

B. The Mechanical Drive.

The mechanical drive consists of the series 29 of idler spur gears, forming a gear train, which drive the output shaft 37 via two planetary gear reducers. Adequate performance is obtainable without the use of a tachometer, due largely to the low inertia of the preferred brushless motor.

Figure 3:
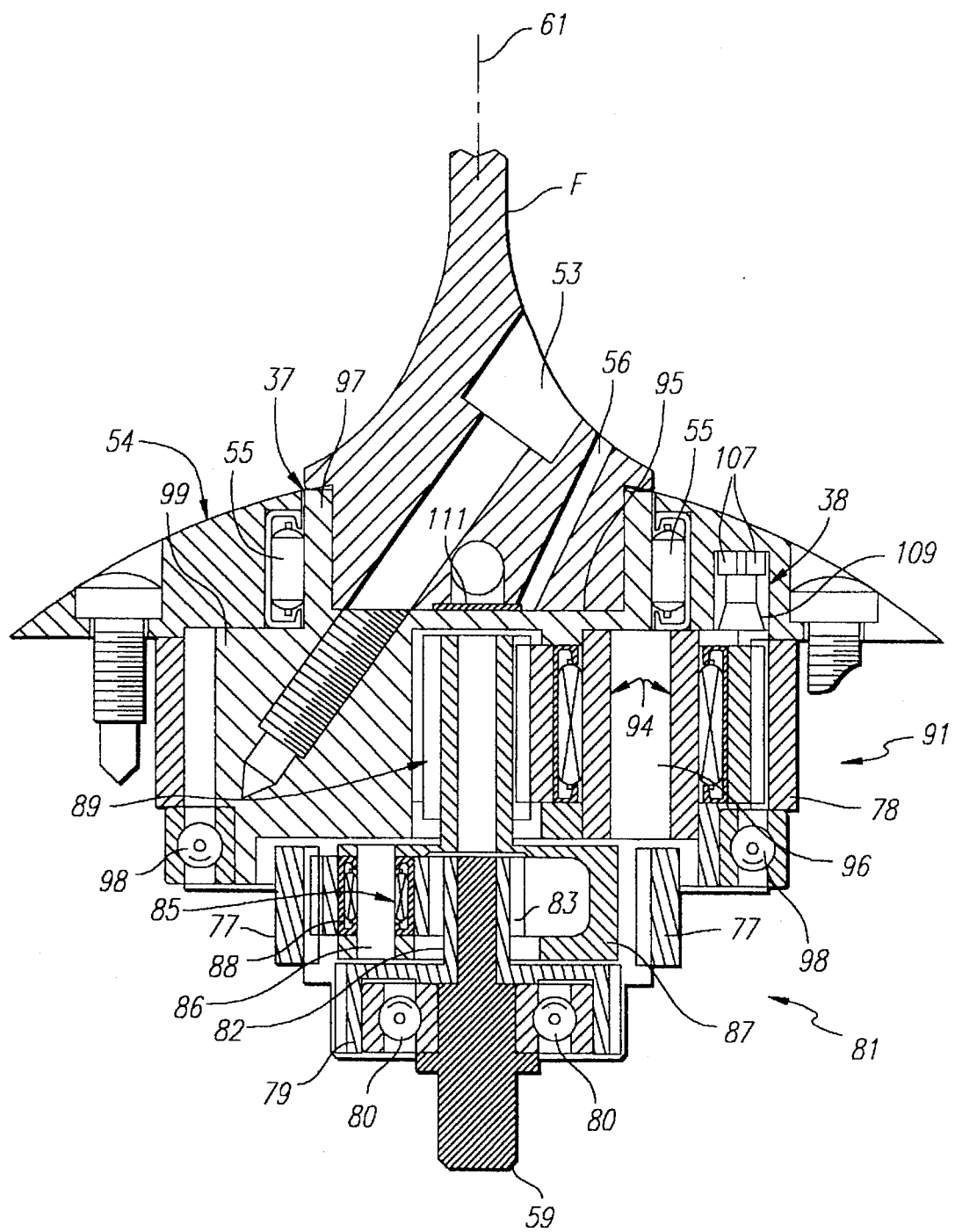
FIG. 3 is a cross-sectional view similar to FIG. 1B, but which illustrates the reduction gearing for one missile fin actuator only.

As best seen in FIG. 3, the output shaft 37 itself forms part of the planetary gear assembly 47, and in particular, helps form a planetary gear cage 95 that holds and rotates together with three orbiting planet gears within a second stage 91 of the planetary gear assembly. In the planetary gear assembly 47, two external ring gears 77 and 78 are held stationary, while the planet gears (3 in each stage) rotate the next stage and, ultimately, the output shaft 37.

As seen in FIG. 1C, the series 29 of idler spur gears carry the motor's force from the motor pinion 67 to a final idler gear 79, just below the first reduction stage 81 of the planetary gear assembly. The final idler gear 79 is mounted upon the stationary pin 59 (as better seen in FIG. 3), and rotates about the pin by virtue of a set of ball bearings 80. The final idler gear 79 is directly coupled to a pinion 82, which extends upward into the first reduction stage 81 and forms a sun gear 83 of that stage.

The sun gear 83 of the first stage is mounted at the very center of the first stationary, circular ring gear 77. As the sun gear 83 rotates, it causes three orbiting planet gears 85 to revolve around the sun gear. Each of these three planet gears 85 (only one is shown in FIG. 3) is mounted upon a pin 86 which extends downward from an intermediate cage 87, and rotates upon the pin by the virtue of needle bearings 88. Three planet gears 85 are used, instead of just one, to reduce loading experience by each gear. Orbit of the three planet gears 85 about the first stage sun gear 83 will cause less frequent rotation of the intermediate cage than of the final idler gear 79, but with increased force, thereby achieving a first stage gear reduction.

As with the final idler gear 79, the intermediate cage 87 also has a pinion, and extends upward into a second reduction stage 91 of the planetary gear assembly 47 and becomes a second stage sun gear 89. The second stage sun gear 89 is located just above the first stage sun gear 83 in FIG. 3. As was the case for the first reduction stage 81, the second stage sun gear 89 also rotates in the center of the second stationary, circular ring gear 78, and drives three orbiting planet gears 94 (again, one planet gear is shown in FIG. 3). Each of these second stage planet gears is also mounted upon a pin 96, this time held by the planetary cage 95 of the output shaft 37. Orbit of the three second stage planet gears 94 about the second stage sun gear 89 will cause less frequent rotation of the planetary cage than the intermediate cage with heightened force, and will effectuate the 207.7:1 gear reduction.

Figure 4A:
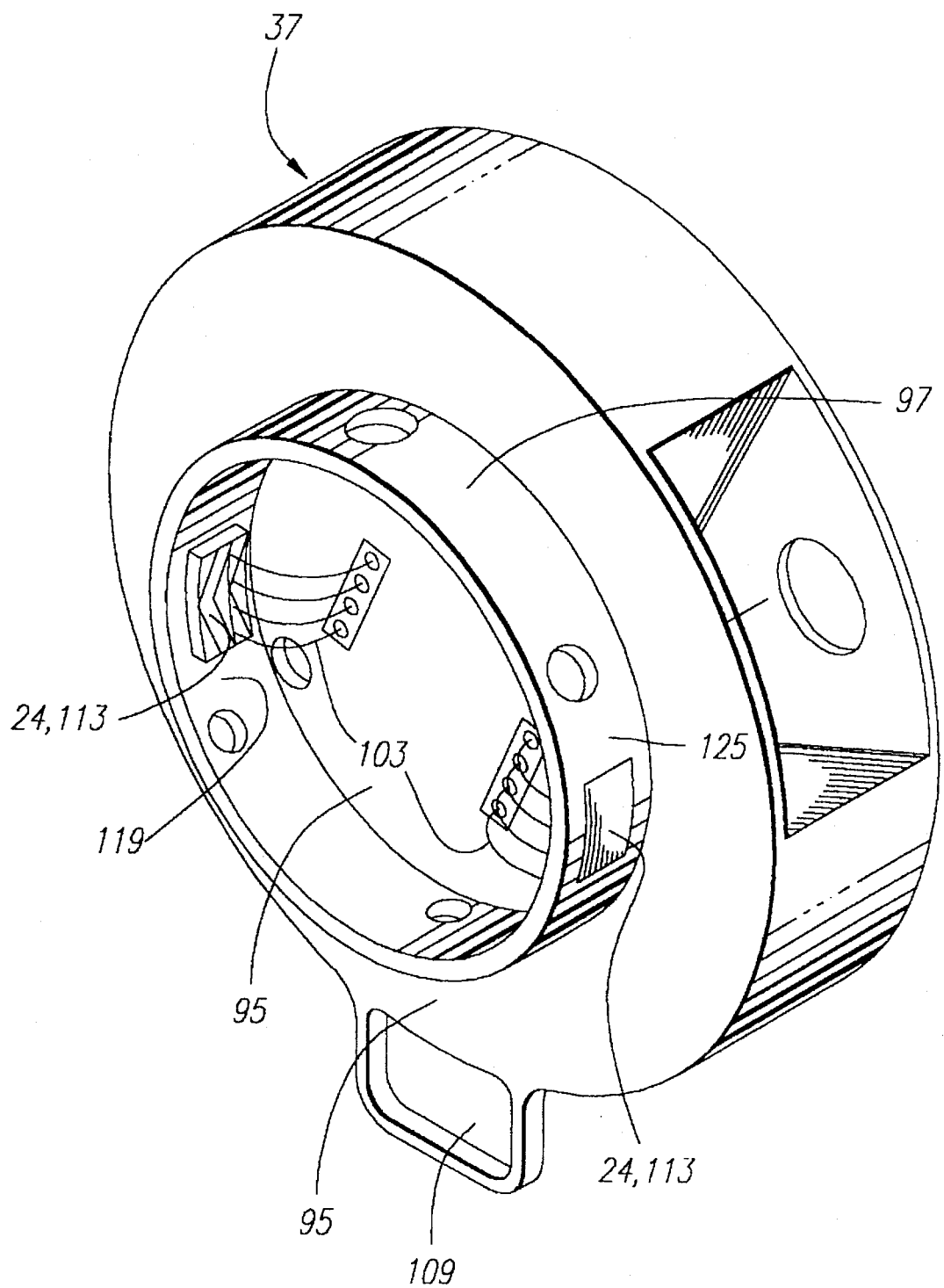
FIG. 4A is a perspective view of an output shaft, where a missile fin connects to the missile.
Figure 4B:
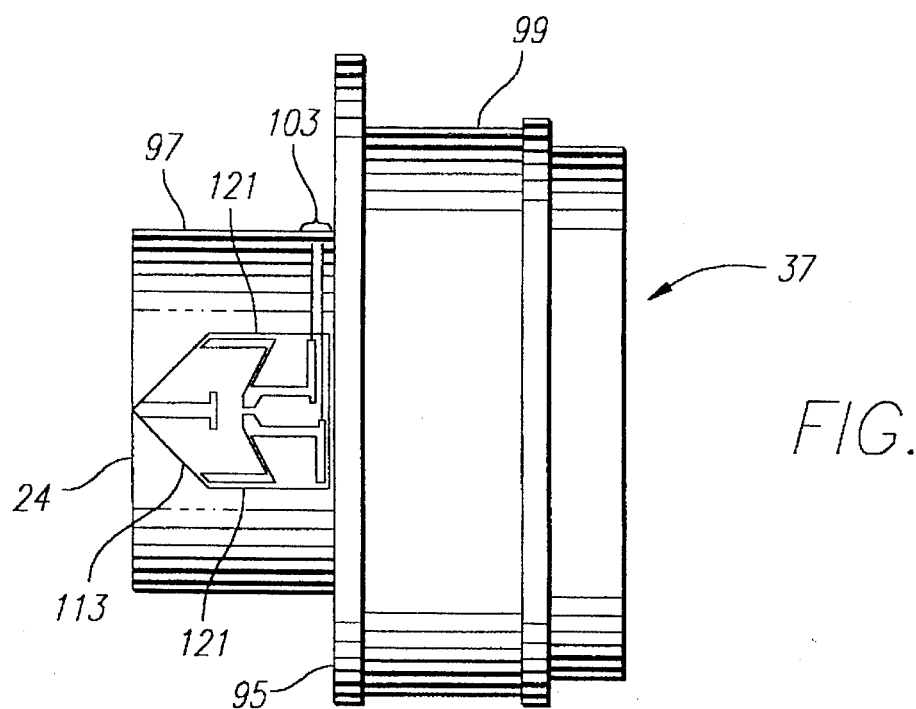
FIG. 4B is a side view of the shaft of FIG. 4A.
Figure 4C:
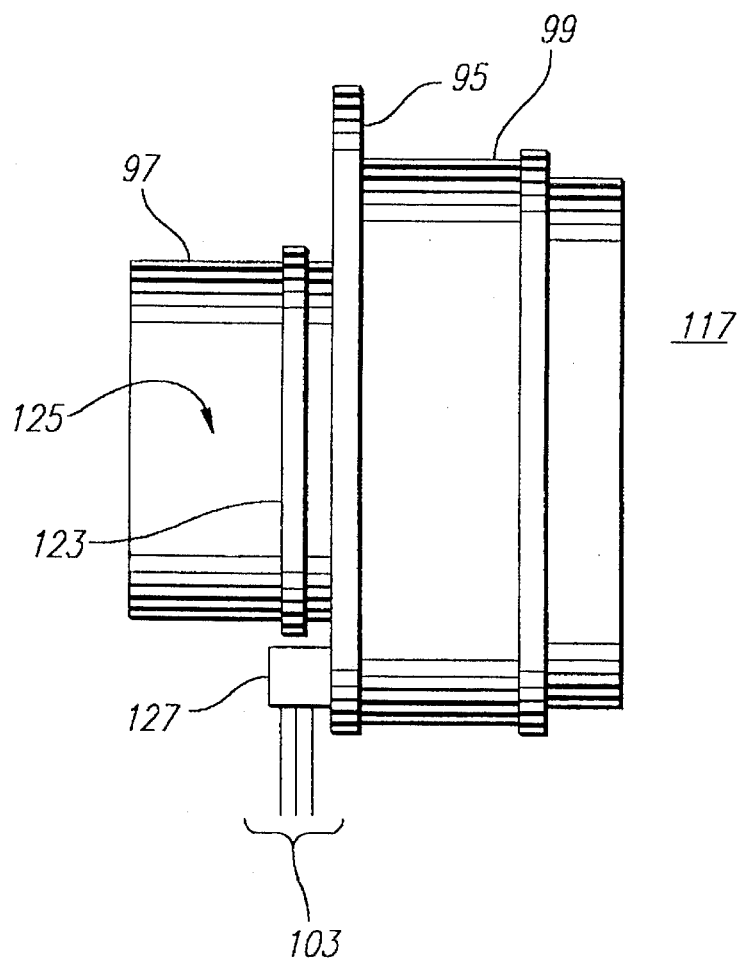
FIG. 4C is a side view of another output shaft, similar to that or FIG. 4B, but which illustrates the use of a magnetostrictive sensor as an alternative torque sensor, instead of strain gauges of FIG. 4A.

As is best seen in FIGS. 4A–C, the output shaft 37 is structurally described as a rigid middle circular plate 95 (the planetary cage) lying between two hollow cylinders, one of which is an output hub 97, directly connecting to the missile fin F1, F2, F3 or F4 and receiving a high tensile strength bolt 53, and the other of which 99 is the second stage planetary cage. The torque sensor 24 is carried by the output hub 97, as will be described below. As mentioned, the output shaft 37 is supported for rotation by the bearing cap 54 via the needle roller bearings 55, and is also supported by ball bearings 98. The output shaft 37 also mounts a precision dual tang brush 109, which slidably contacts two resistive tracks 107, formed along the interior of the bearing cap 54. One of the tracks 107 is a high resistance track having +10 volts coupled to one end and −10 volts coupled to the other, while the second track is s low resistance track that is tapped to provide a position sensor signal. This signal is fed through grooves 56 in the bearing cap 54 upward along the missile and to the control electronics 13. Incidentally, FIG. 3 indicates placement of an alternative torque sensor, namely, a diaphragm strain gauge 111, which is placed directly upon the planetary cage 95.

Accordingly, the gear reduction causes the output shaft 37 to rotate more slowly and with increased torque than the motor shaft 31, by virtue of the 207.7:1 reduction ratio. As the brushless dc motor 27 is caused to rotate in a first rotational direction (i.e., clockwise), the output shaft 37 will be driven in a corresponding rotational direction. When the brushless dc motor 27 is called upon to rotate in the opposite rotational direction, the corresponding missile fin F1, F2, F3 or F4 will be rotated in the other direction accordingly.

C. The Torque Sensor.

Figure 5A:
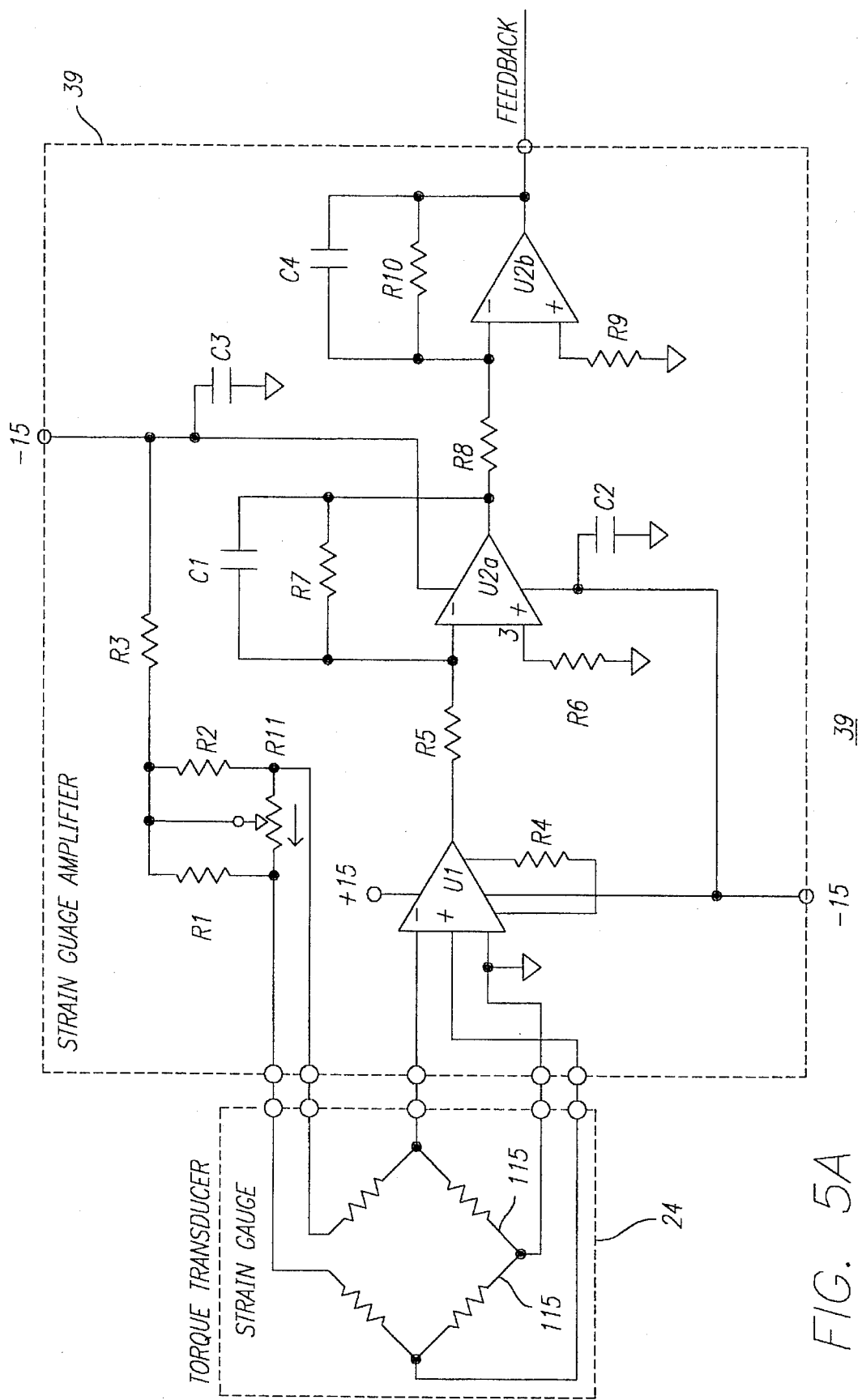
FIG. 5A is a schematic diagram of the torque sensor and amplifier circuit used for each missile fin in the preferred embodiment, illustrated as having the two strain gauges seen in FIG. 4A.

Three embodiments are disclosed below for a torque sensor 24. The first, preferred embodiment, illustrated in FIGS. 4A and 4B, includes two chevron-shaped strain gauges 113 that are mounted about the circumference of the output shaft 37, i.e., within a cylindrical interior 119 of the output hub 97. The second embodiment 111, shown in FIG. 3, is also a strain gauge, but is shaped as a diaphragm, and is mounted upon the middle plate 95 (planetary cage) of the output shaft 37, across the output shaft. Finally, a magnetostrictive torque sensor 117 (FIG. 4C) is also disclosed as a third torque sensor embodiment. In terms of electronic configuration, each of the strain gauges 111 or 113 is formed as part of a 4-part resistance bridge, as indicated in FIG. 5A. The magnetostrictive sensor 117 provides an output that merely needs to be scaled, and does not require balancing resistors or a bridge structure. Selection of a suitable scaling circuit is within the skill of ordinary electronics, and will vary depending upon the particular sensor used.

1. Strain Gauges.

The preferred embodiment is illustrated in FIGS. 4A and 4B, where the output hub 97 mounts two chevron-shaped strain gauges 113 within the interior 119 of its hollow cylindrical shape. That is to say, each strain gauge 113 has two arms 121 which lie at a 45° angle to the fin rotational axis 61. Depending upon the force encountered by a missile fin F1, F2, F3 or F4, as it is turned, stress will be imparted to the output shaft 37, changing the resistance experienced by the strain gauges. To measure this, a voltage is connected in series across the strain gauges. This will produce a variable voltage output that directly varies with rotational torque experienced by the output shaft 37. These leads 103 are conveyed through the planetary cage 95, and then pig-tailed to grooves 56 in the bearing cap 54 and routed to the electronics section 25 that is associated with a particular fin. Accordingly, the electronics section 25 electronically adjusts the command from the guidance computer to compensate for torque experienced by each missile fin.

a. Use of A Diaphragm Gauge.

Figure 2:
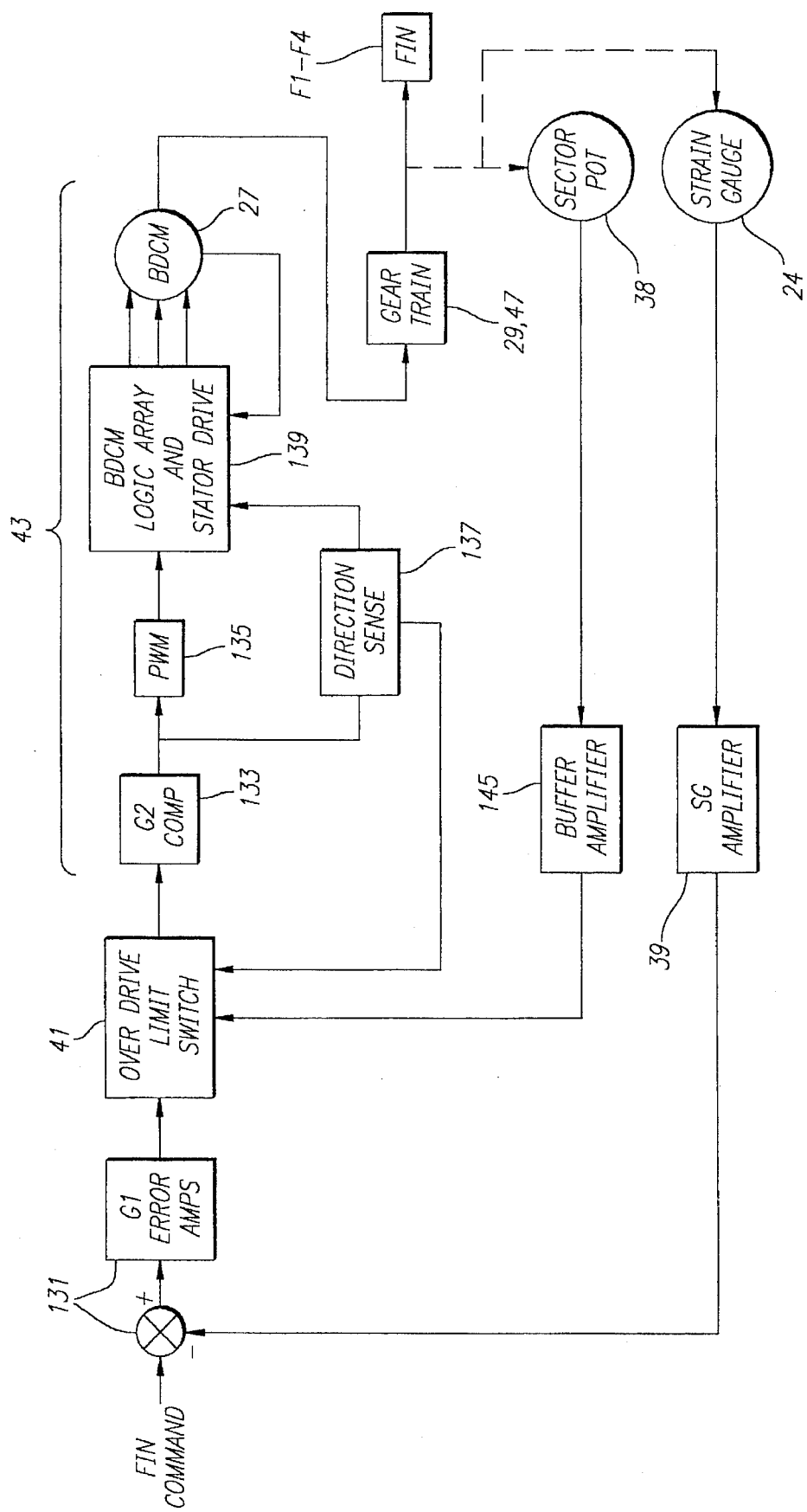
FIG. 2 is a control flow diagram that illustrates control of each one of the missile fins, using both of electronics mounted above the four missile fins in FIG. 1, and the torque and position sensor for each fin, to provide signals to those electronics.

Output shaft torque can also be measured by a diaphragm strain gauge 111, which uses meandering foil strands near the circumference of the middle plate 95 of the output shaft 37, just beneath the output hub 97. As torque is experienced by the output shaft 37, the strands become stretched, changing their electrical resistance properties. This can be measured and then fed back, via sensing leads 103, to the control electronics 13, as explained above. Placement of a diaphragm strain gauge 111 is indicated in FIG. 2. This sensing configuration advantageously provides ease of installation and good strain sensitivity. It is not, however, necessarily the optimal arrangement for measuring torque, because it is also somewhat susceptible to lateral and axial interferences. For these reasons, it is preferred to use the chevron-shaped strain gauges 113, described above.

2. Alternative Use Of A Magnetic Sensor.

There are also other ways of measuring the torque experienced by the missile fins F1–F4, and one contemplated way of doing this is indicated in FIG. 4C. FIG. 4C shows a magnetostrictive sensor 117, that is, a sensor that measures strain magnetically. As seen in FIG. 5C, the output hub 97 rigidly mounts a ring-shaped magnet 123 about its cylindrical exterior 125. This magnet 123 creates a magnetic field at times when stress is created by torsion of the output shaft 37. A magnetic detector 127 mounted by the middle plate 95 detects this magnetic field, and produces a voltage that depends directly upon the sensed magnetic field. The output of the detector is used by the fin's electronics section 25 as a direct feedback of torque. Again, as with the preferred sensor 113, described above, sensing leads 103 are used to return an electronic indication from the torque sensor to the control electronics 13.

D. The Position Sensor.

Output position is measured by a precision sector potentiometer/wiper 38, the contact brush 109 of which, as mentioned, is mounted on the output shaft 37. Maximum excursion of the sensor 38 is approximately 160°, selected for ease of phasing adjustment. This feature also makes possible a fin positioning system with a deflection as much as ±60° degrees, if required. In this application however, the potentiometer is not used as a conventional feedback or controlling element. It is used solely to detect output shaft 37 overtravel in conjunction with electronic limiter 41 of the fin's electronics section 25. In the event that the output shaft rotates beyond the maximum angle set point, an electronic limiter 41 of the electronics section 25 disables the motor driving further beyond the limit, but permits drive in the reverse direction. This tactic ensures that the system will not hang up after the output shaft 37 has exceeded either positive or negative limit.

As best seen in FIG. 3, the position sensor 38 includes two resistive tracks 107, mounted to the bearing cap 54, and also the contact brush 109, mounted by the output shaft 37. The brush 109 establishes a moving short between the two resistive tracks 107, in a windshield wiper motion as the output shaft 37 rotates. One of the tracks, as mentioned, is a high resistance track that has +10 volts connected to it at one end of the track, corresponding to a full 80° swing in one rotational direction, and −10 volts connected to it at the other end, corresponding to a full 80° swing in the other rotational direction. The resistance of this track is uniform, and so, when the fin F1, F2, F3 or F4 is in the null position, the brush 109 should contact the track at a location corresponding to zero volts. As the output shaft 37 rotates, the brush 109 will move along the high resistance track and short its voltage at their mutual point of contact to the second, low resistance track. This track is tapped by a lead which returns to the control electronics 13 via one of the grooves 56 in the bearing cap 54. Thus, the position sensor can couple an electrical voltage that varies between ±10 volts, dc, depending upon the fin's rotational position. However, since the fin is preferably limited to ±30° range of motion, the voltage provided by the position sensor 38 normally varies only between −3.75 volts and +3.75 volts, and is scaled by an amplifier U7a, as seen in FIG. 5C. It is this amplified signal that is used for overdrive limit protection by the electronics section 25 of each fin's actuator 15, 17, 19 or 21.

IV. The Electronics Section For Each Fin.

Figure 5B:
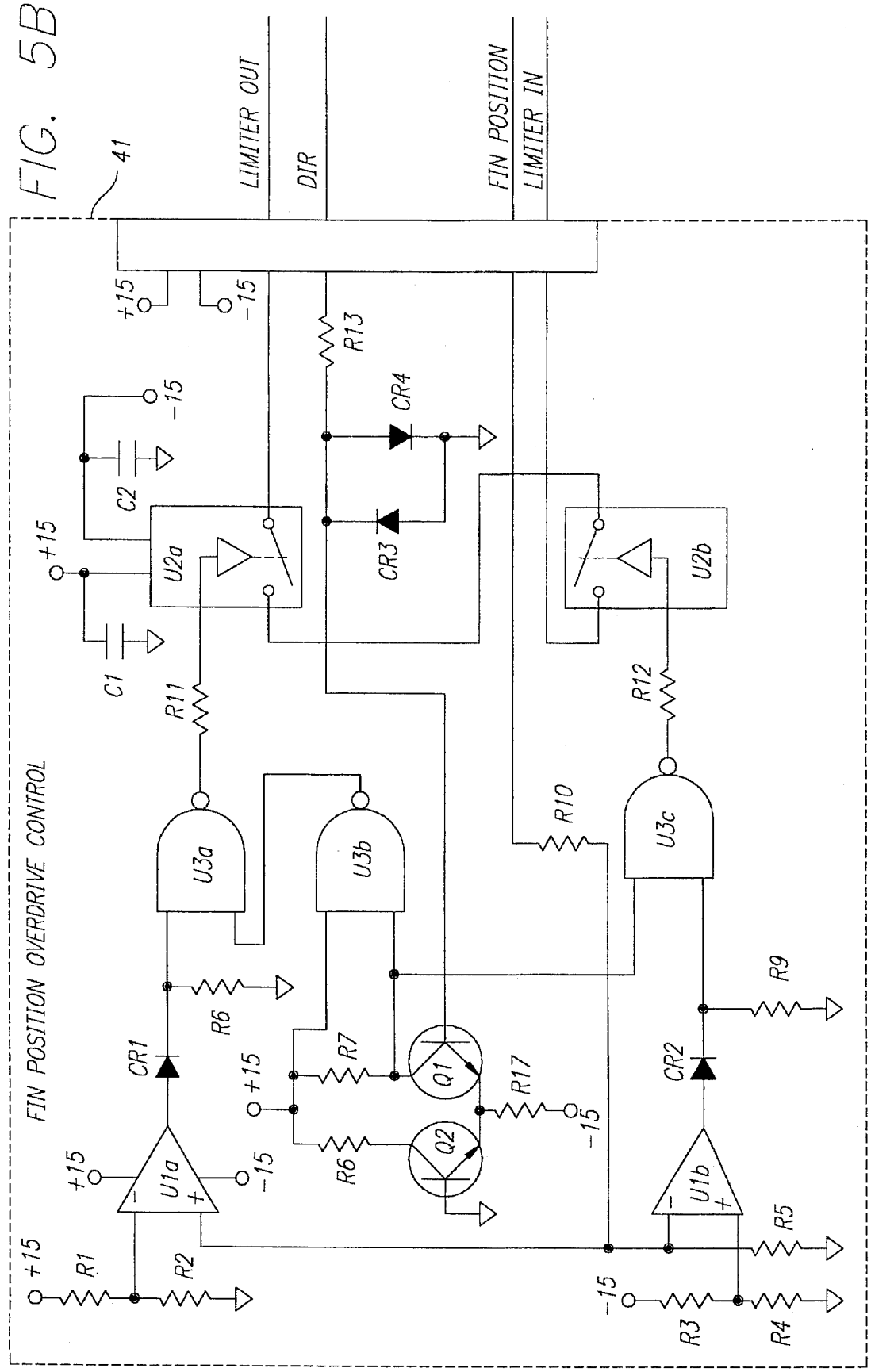
FIG. 5B is a schematic diagram of an electronic limiter used for each circuit of FIG. 5A. The electronic limiter receives both a feedback-modified torque signal, from the circuit of FIG. 5C, and an indication of the missile fin's position, and uses these to keep the torque command from rotating the missile fin beyond ±30°.
Figure 5C:
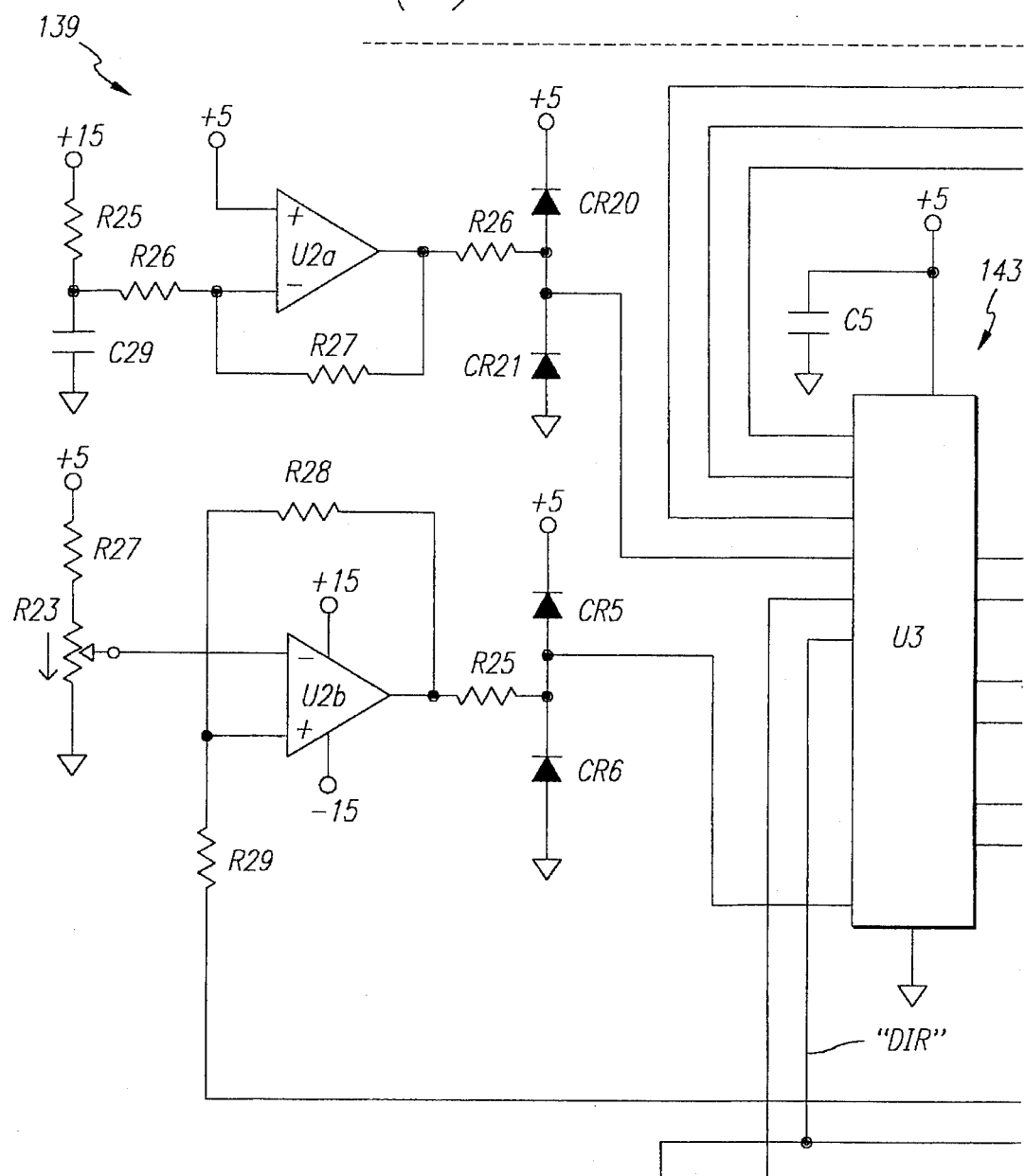
FIG. 5C shows the relative layout of the FIG. 5(C)(a), FIG. 5(C)(b), FIG. 5(C)(c), FIG. 5(C)(d), FIG. 5(C)(e), and FIG. 5(C)(f), which together form a single schematic diagram diagram. Together, these individual diagrams form a diagram of a main circuit, used with the circuits of FIGS. 5A and 5B, for each missile fin. This main circuit both modifies a guidance torque command received from a flight computer (not shown) using rotational torque feedback from the circuit of FIG. 5A, and it also electronically controls movement of a brushless d.c. motor for the corresponding missile fin.
Figure 5C:
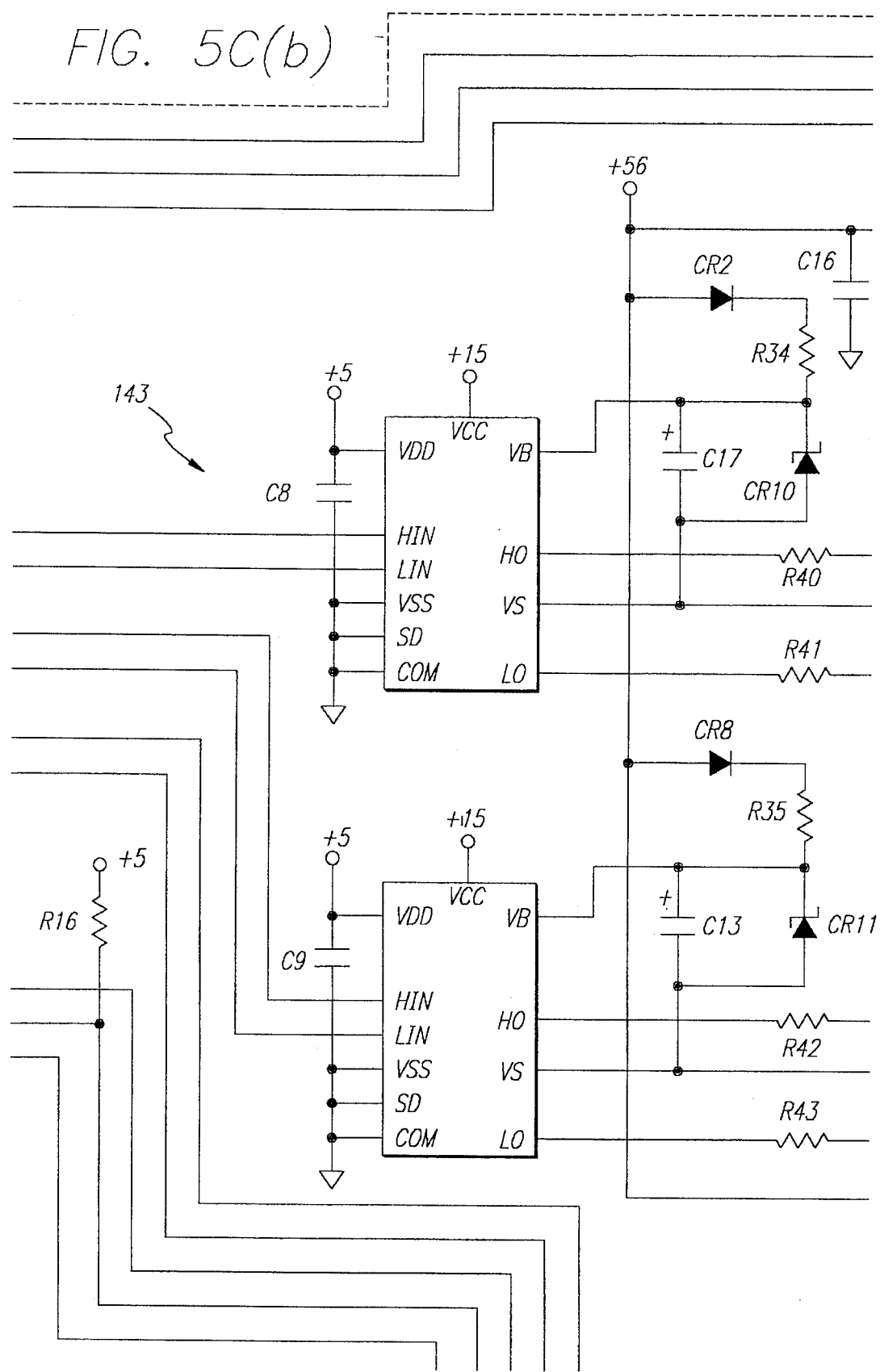
Figure 5C:
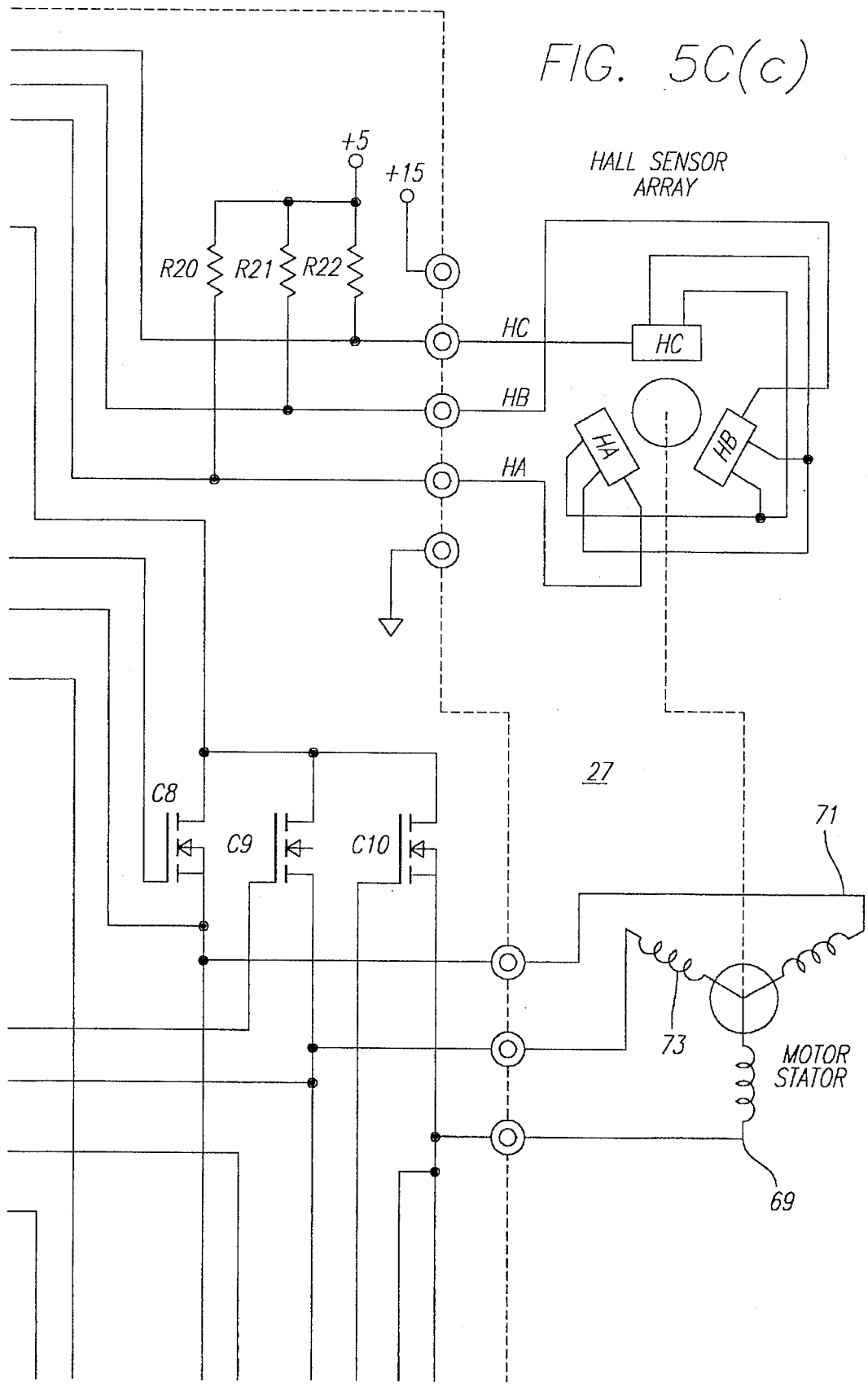
Figure 5C:
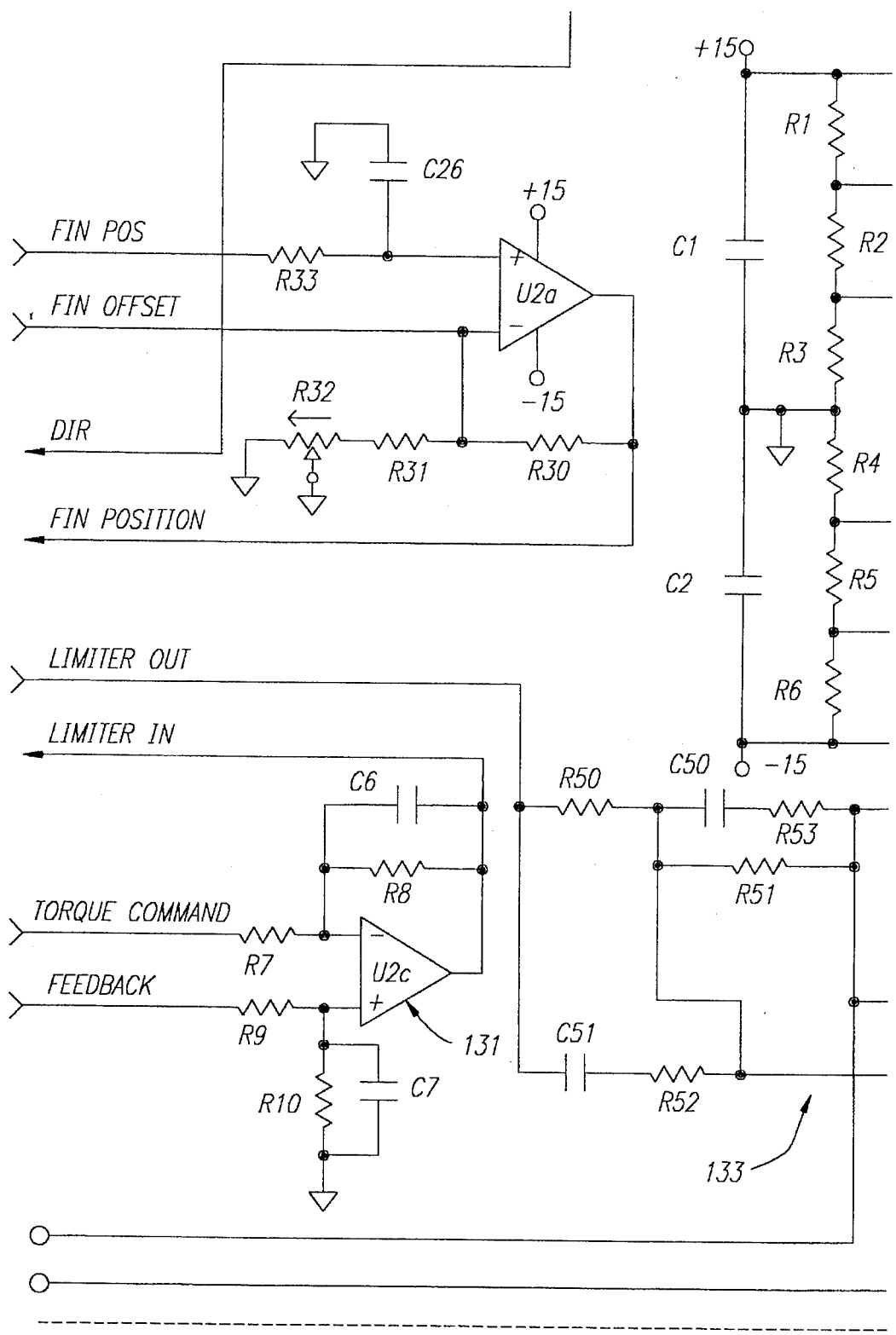
Figure 5C:
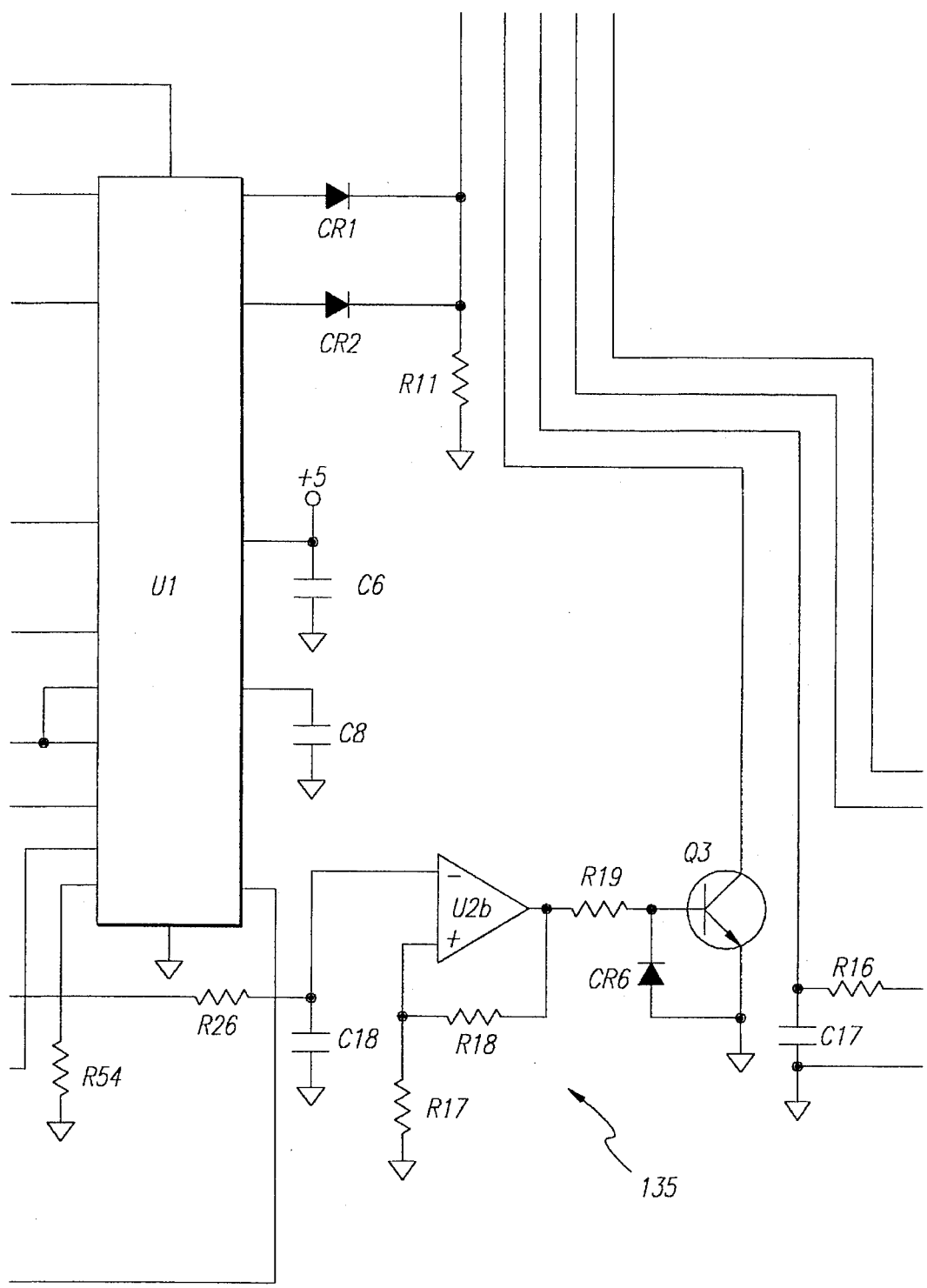
Figure 5C:
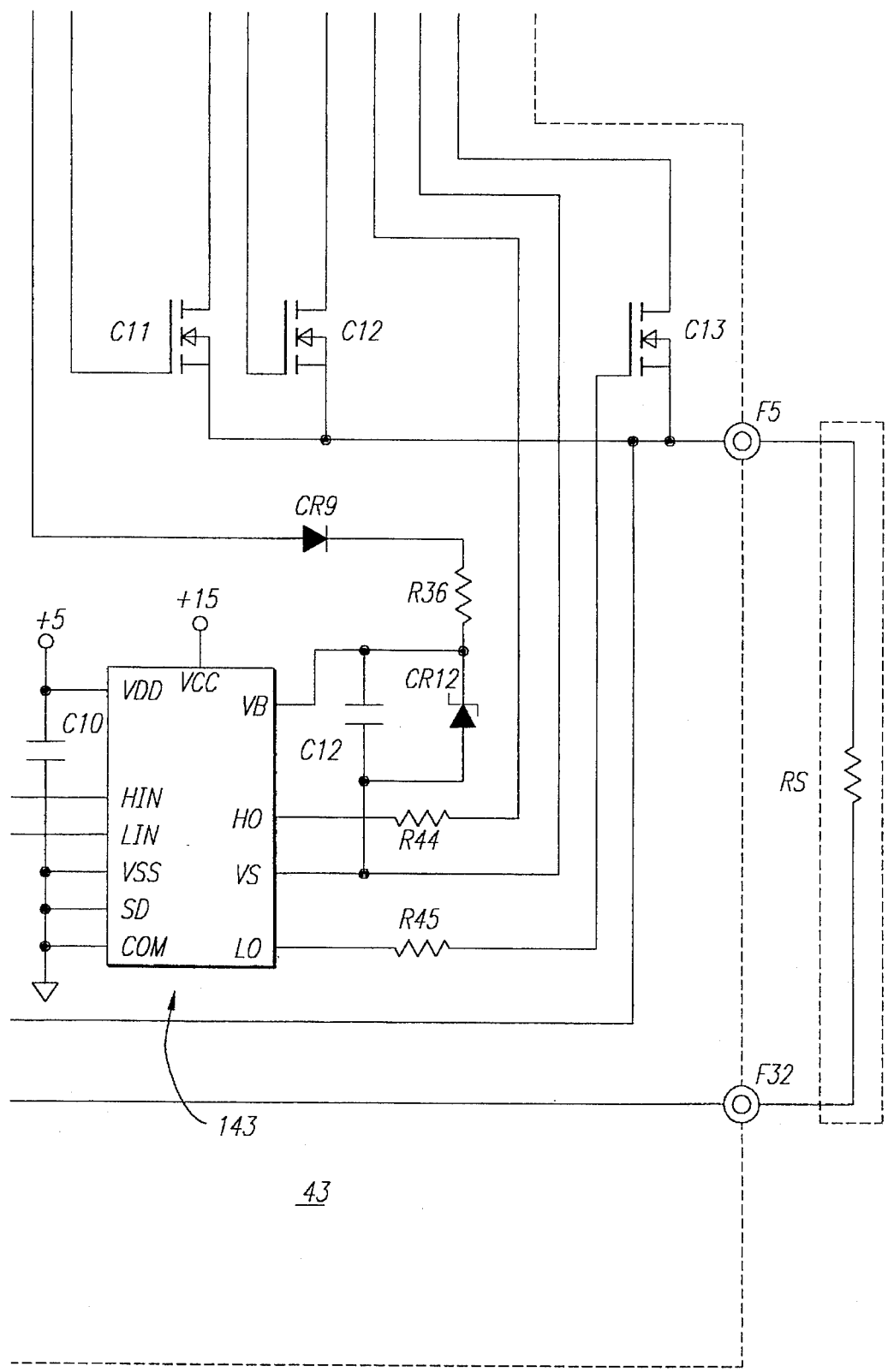

As mentioned earlier, the electronics section 25 for each fin F1–F4 includes three main blocks, which are schematically shown, respectively, in FIGS. 5A–C. Individual circuits shown in these figures include both integrated chips, identified by conventional mnemonics "U1," "U2," "U3," etc., for each of these figures, and also other elements such as resistors, capacitors, power switching transistors, etc. These will be explained further below without reference to the particular values for these elements. However, it is well within the skill of one familiar with electronics to derive values for these components, which can vary in dependence of the particular actuator implementation. The fin electronics sections 25 each contain a number of circuits which perform functions, including: an amplifier 39, that amplifies the torque feedback; a summing junction 131, that corrects the torque command from the guidance computer with the torque feedback signal; an electronic limiter or overdrive circuit 41; an active filter circuit 133; a pulse width modulation circuit 135, that provides a pulsed signal indicating how fast the motor 27 should rotate; a polarity circuit 137, that indicates polarity of the feedback-compensated torque command and provides that indication to each of the electronic limiter; and, the motor control circuit 139, which takes the pulse width modulation circuit's output signal and the polarity command, and drives each of the three motor stators 69, 71 and 73 of the brushless dc motor 27. The motor control circuit 139, as mentioned, also receives feedback from three Hall detectors HA, HB and HC as to the motor's position, and uses these to drive the motor further if it does not produce the commanded amount of torque.

The electronics section 25 for each missile fin therefore uses a difference between the input torque command from the guidance computer, and the torque feedback, to drive the electromechanical section 23 to rotate the fin, as appropriate.

A. Torque Feedback (FIG. 5A).

The torque feedback block includes both the torque sensor 24 and a signal amplifier 39, as illustrated in FIG. 5A.

A precision instrumentation amplifier is used to raise the strain gauge output signal amplitude to a suitable level, typically 0.0167 volts per inch-pound. The torque sensor 24 is preferably a four arm strain gauge bridge configuration supplied with a +15 volt rail via a Vernier balancing network, consisting of R1–R3 and R11 of FIG. 5A. The bridge's output is amplified by the precision instrumentation amplifier, identified as U1, and two subsequent amplifiers U2a and U2b, which also provide noise filtering. The final output level is comparable to that of the torque command, typically at a scale factor of 8.4 inch-pounds per volt, or 0.119 volts per inch pound. The output of amplifier U2b (labelled "feedback") is connected to motor drive circuit (FIG. 5C), and in particular, to the summing junction 131, where it is summed together with a torque command for the fin F1, F2, F3 or F4, provided by the guidance computer. The torque error compensated signal produced by the summing junction is then fed to the electronic limiter 41, seen in FIG. 5B, and is labelled "Limiter In.".

B. Electronic Overdrive Protection (FIG. 5B).

The "Limiter In" signal from the summing junction 131 is provided to the electronic limiter 41, which performs electronic overdrive protection. The limiter 41 passes this torque command through two switches, identified in FIG. 5B as U2a and U2b, which are controlled to disable the torque command and prevent it from controlling the motor if: (1) the "Fin Position" signal (from FIG. 5C) indicates that the fin is at or beyond one of its +30° or −30° limits; and (2) the Limiter In signal is attempting to drive it further outside the limits, i.e., not back toward them.

Angular clockwise and counter-clockwise limits are respectively set by two voltage dividers, formed of R1 and R2, and formed of R3 and R4, respectively. These dividers will provide a voltage input to comparators U1a and U2a, respectively, which is set to be that voltage held by the ±10 volt, dc, signal from the position sensor when the fin is at its ±30° limits. Comparator U1a will deliver a +15 volt signal through CR1 to NAND gate U3a only if the "Fin Position" signal exceeds the reference voltage established by R1 and R2. Likewise, comparator U1b will deliver a −15 volt signal through CR2 to NAND gate U3c only if the "Fin Position" signal is exceeded by the reference voltage established by R3 and R4. FET switches U2a and U2b both remain closed if NAND gates U3a and U3c both have high outputs which is the normal case when the fin position is between the limits. If the "Limiter In" signal (which determines motor direction) is tending to drive the fin further into the region beyond the +30° limit, the direction signal will be high and cause a high level to appear at the output of U3b. This polarity results from the fact that Q1 and Q2 act as an inverter and level shifter, and U3b also is wired as an inverter. Since the output of U1a will become low, the output of U3a will also go low and open switch U2a. This condition shuts off the motor control circuit 139. Once the sign of the "Limiter In" signal (i.e., the torque error compensated signal) reverses due to a command reversal, the direction signal ("Dir") goes to zero and U2a closes again, permitting the fin to be driven back between the desired ±30° limits. The same mode of operation is employed for the other limit (−30°), except that the complement of the "Dir" signal appearing at Q1 collector is required. This arises from the fact that the torque error compensated signal is now in the reverse sense. The purpose of a clamp circuit formed by CR3, CR4 and R13 is provided to avoid overbiasing the balanced inverter/level shifter Q1 and Q2. Diodes CR1 and CR2 prevent negative bias levels at the NAND gate inputs.

The torque error compensated signal, i.e., the "Limiter In" signal seen in FIGS. 5B and 5C, is passed as an output of the electronic limiter 41 when the fin is between its limits, or moving toward the limits. This output is identified in FIGS. 5B and 5C as "Limiter Out."

C. Motor Control (FIG. 5C).

The main drive circuit 43, indicated schematically in FIG. 5C, contains the summing junction 132, the pulse width modulation circuit 135, the polarity circuit 137, and the motor control circuit 139. The motor control circuit 139 includes the motor 27, stator switches Q8–Q13 (generally, 141), stator control logic 132, and analog preamplifiers.

The input torque command (labelled "Torque Command" in FIG. 5C) from the guidance computer is provided to one input of the summing junction 131 (U2c). The amplified torque feedback signal (labelled "Feedback," from FIG. 5A) provides the other input to this summing junction U2c. The summing junction 131 is an amplifier, which has an approximate gain of 25 and has its torque error output routed to the electronic limiter 41, as the "Limiter In" signal. It returns to the circuit of FIG. 5C as the "Limiter Out" signal, and is then provided to the active filter 131. In normal operation, i.e. within safe angular limits, the torque error signal directly returns to the main drive circuit 43 without alteration. The operational amplifier for the active filter 133 is contained within the PWM (pulse width modulation) integrated circuit U1. Components R51, R52, R59, C50 and C51 are selected to optimize frequency and transient responses. A comparator, identified in FIG. 5C as U2b, is also provided with the torque error signal, and is utilized as part of the polarity circuit 137, e.g., a zero crossing detector. It senses the sign of the torque error signal at the output of the active filter 133. Components R24 and C18 act as a noise filter, and add a slight delay in the timing of the direction signal to protect the logic circuits. Transistor Q1 will therefore deliver a +5 or zero voltage level depending on the polarity of the error signal. This direction signal "Dir" is used to steer the logic within the PAL (programmable array logic, U3) for clockwise and counter-clockwise rotation of the motor. It is also used in the electronic limiter as has been described above.

The PAL, U3, is the heart of the stator control logic 143, and produces six pulsed square waves in response to the torque error compensated signal, one pair for each of U4, U5 and U6. These latter chips are form part of the stator control logic 143, and they each receive a corresponding two of the six pulsed signals, one representing "on," or a high output to the corresponding stator, and the other representing "off," or a low output to the corresponding stator 69, 71 or 73. The "on" time is proportional to amplitude of the torque error. The PAL adjusts the signals within each pair, and the relative timing of the three pairs, so that average motor current is a function of torque error. The phase sequence of these logic pairs determines the direction of rotation. Rotor position is read out by the three Hall detectors HA, HB and HC, which deliver unique three bit codes back to the PAL U3 as a motor position feedback signal. This information is used to determine which pair of power devices is to be turned on to produce continuous motion and torque.

The control for each stator 69, 71 and 73 includes two N type MOSFETS, labelled Q8–Q13 in FIG. 5C. Gate drive for each pair, Q8/Q11, Q9/Q12 or Q10/Q13, is provided by a corresponding one of U4, U5 and U6, which also perform level shifting for the upper member (Q8, Q9 or Q10) of each transistor pair. Regulated float potentials are derived from the 56 volt battery by three networks like R34, CR7 and CR10.

The preferred motor control circuit 139 also implements current limiting, by comparing the average motor current as measured by a sampling resistor RS with an adjustable reference at R23. The output of a comparator U2a is clamped between +5 volts and ground by CR5 and CR6. If +5 volts appears at the juncture of CR5 and CR6, the six pulsed output signals of U3 are inhibited until such time as the average motor current falls below set point. In order to allow orderly start up of the stator control logic 139, initiation of the PAL U3 is delayed by the resistor-capacitor combination R25/C19, and comparator U2d. The output of comparator U2d is clamped by CR20 and CR21, between +5 volts and ground. The six output lines of U3 are similarly inhibited as long as +5 volts is sustained at the juncture of CR20 and CR21, i.e. for about 25 milliseconds.

Amplifier U7a is used to present a high impedance load to the fin position sensor 38 and to scale the voltage signal received from the sensor. As mentioned, the preferred fin limits of ±30° represent only approximately 37% of the potentiometer's range, and signal from the position sensor will only vary across approximately ±3.75 volts. Therefore, Amplifier U7a is used to scale the signal received from the position sensor back into a ±10 volt range. The gain of this buffer 145 is controlled by R30, R31 and R32. The correct position scale factor is set by R32, and the buffer output is sent to the electronic limiter 41 via the "Fin Position" signal, as indicated in FIGS. 2, 5B and 5C.

What has been described is a missile fin actuator system that has four steering fins F1–F4, and an actuator that uses torque feedback and electronic overdrive protection for each of the fins, so that they are each adjusted by a torque command which has been error-compensated. Having thus described an exemplary embodiment of the invention, it will be apparent that further alterations, modifications, and improvements will also occur to those skilled in the art. Such alterations, modifications, and improvements, though not expressly described or mentioned above, are nonetheless intended and implied to be within the spirit and scope of the invention. For example, the invention is not limited to a device which actively guides all four fins of a missile, or that implements both of electronic overdrive protection and torque feedback together. Accordingly, the foregoing discussion is intended to be illustrative only; the invention is limited and defined only by the following claims and equivalents thereto.

I claim:

1. An actuator system that receives an input torque command and rotates an aeronautical surface within a prescribed range of motion, comprising:

an output shaft secured to the aeronautical surface, such that axial rotation of the output shaft results in rotation of the aeronautical surface;

a drive motor that controls rotation of the output shaft;

a drive circuit that controls the drive motor, to thereby control axial rotation of the output shaft in response to the input torque command; and a torque sensor operatively coupled to the drive shaft, the torque sensor measuring output shaft rotational torque and providing an electronic representation of the output shaft rotational torque to the drive circuit, wherein the drive circuit receives the electronic representation as a torque command feedback signal, and derives a torque error command as the difference between the input torque command and the output shaft rotational torque;

wherein the drive circuit rotates the output shaft according to said torque error command when said aeronautical surface is within said range of motion; and wherein the drive circuit rotates the output shaft according to said torque error command only if the rotation displaces the aeronautical surface closer to said range of motion when said aeronautical surface is not within said range of motion.

2. An actuator system according to claim 1, wherein:

the actuator system further comprises a position sensor that measures position of the aeronautical surface and provides a position signal representative thereof;

the position of the aeronautical surface is only used to limit excursion of the aeronautical surface outside of the range of motion; and the actuator system further comprises an electronic limiter that provides the torque error command to the drive motor only when the torque error command attempts to drive the aeronautical surface to have an angle that is closer toward lying within the range of motion.

3. An actuator system according to claim 1, wherein the torque sensor includes a strain gauge that measures rotational strain of the output shaft.

4. An actuator system according to claim 3, wherein the torque sensor includes at least two strain gauges forming part of a bridge arrangement.

5. An actuator system according to claim 3, wherein the torque sensor includes at least two strain gauges forming part of a bridge arrangement, both strain gauges mounted circumferentially about the output shaft.

6. An actuator system according to claim 3, wherein the strain gauge is a diaphragm strain gauge that is mounted perpendicularly to the output shaft.

7. An actuator system according to claim 1, wherein the torque sensor includes a magnetostrictive sensor that magnetically measures rotational torque of the output shaft.

8. An actuator system according to claim 1, wherein the drive motor is a brushless direct current motor.

9. An actuator system that controls each aeronautical surface of at least two symmetrical pairs of aeronautical surfaces within a prescribed range of motion, according to at least one input torque command, the actuator system comprising:

an output shaft corresponding to each aeronautical surface;

an electronic drive circuit that separately controls rotation of the each output shaft; and at least one drive motor that powers shaft rotation; and a torque sensor for each of the four output shafts, each torque sensor measuring output shaft rotational torque experienced by a corresponding output shaft, providing an electronic representation of the output shaft rotational torque applied to the corresponding output shaft;

the drive circuit derives a torque error command for each output shaft, as a difference between the input torque command and the output shaft rotational torque;

wherein for each output shaft, the drive circuit rotates the output shaft according to said torque error command when the aeronautical surface is within said range of motion; and wherein for each output shaft the drive circuit rotates the output shaft according to said torque error command only if the response moves the aeronautical surface closer to said range of motion when said aeronautical surface is not within said range of motion.

10. An actuator system according to claim 9, wherein each torque sensor includes a strain gauge that measures rotational strain of each output shaft.

11. An actuator system according to claim 10, wherein the strain gauge is a diaphragm strain gauge coupled to the output shaft.

12. An actuator system according to claim 10, wherein each torque sensor includes at least two strain gauges forming part of a bridge arrangement.

13. An actuator system according to claim 9, wherein each torque sensor includes a magnetostrictive sensor that magnetically measures rotational torque of each output shaft.

14. An actuator system according to claim 13, wherein the magnetostrictive sensor includes a magnetic ring that generates a detectible magnetic field when it undergoes torsional strain.

15. A method for controlling motion of an aeronautical device using at least one aeronautical surface that provides lift within a prescribed range of motion, an input torque command provided by a guidance system, an electronic drive circuit, a motor controlled by the drive circuit, an output shaft that rotates the aeronautical surface, and a torque sensor that senses torque in the output shaft, the method comprising:

establishing a range of motion for said aeronautical surface;

sensing rotational torque of the output shaft using the torque sensor and generating an electronic representation of that rotational torque;

receiving both the electronic representation from the torque sensor and the input torque command, and computing a difference between the electronic representation and the input torque command to obtain a torque error command;

generating a motor drive signal with the drive circuit in response to the torque error command; and using the motor to rotate the output shaft to compensate for the torque error command, at all times that the aeronautical surface is within said range of motion; and rotating the output shaft to compensate for the torque error command only if the rotation displaces the aeronautical surface closer to the range of motion, when the aeronautical surface is not within said range of motion.

16. A method according to claim 15, wherein the aeronautical device is a missile having at least two missile fins arranged in a symmetric pair about a body of the missile, each fin in the symmetric pair having its own output shaft and torque sensor, the method further comprising:

using the torque sensors to sense separately, for each fin in the pair, rotational torque which is experienced by the corresponding output shaft, and to generate electronic representations of torque experienced by the output shaft of each fin in the pair;

receiving both of the electronic representation and the input torque command for the fin corresponding to each sensor, and summing them together using the drive circuit; and providing an error-compensated torque command independently to each missile fin in the symmetric pair, by modifying the motor drive signal for each fin in response to the electronic representation for the fin.

17. A method according to claim 16, wherein the missile has at least two symmetrical pairs of fins that are arranged in substantially perpendicular planes, each of the four fins having an output shaft and a torque sensor, the method further comprising:

sensing torque in each of the four output shafts, independently of one another;

modifying torque for each of the four fins separately using the electronic representation provided by the torque sensor for the corresponding fin; and driving each of the four fins separately using a torque error command produced for each fin.

18. A method according to claim 15, wherein the aeronautical device further has a rotational position sensor and an electronic limiter, which prevents rotation of the aeronautical surface past at least one predetermined angular limit, the method further comprising:

sensing a rotational angle held by the aeronautical surface using the position sensor;

generating an electronic position signal that indicates the rotational angle;

receiving the electronic position signal with the electronic limiter and comparing that electronic signal with the predetermined angular limit; and limiting the torque error command in a manner to prevent it from causing the aeronautical surface to rotate beyond the predetermined limit.

19. A method according to claim 18, wherein the electronic limiter includes at least two predetermined angular limits which define an angular range that the aeronautical surface is to rotate between, the method further comprising:

comparing the electronic position signal with each of the two predetermined limits using the electronic limiter; and limiting the torque error command to prevent the aeronautical surface from rotating away from the range when the surface has an angle which is outside of the range.

20. A method according to claim 19, further comprising:

analyzing the polarity of the torque error command with the electronic limiter to determine which rotational direction it attempts to drive the aeronautical surface;

also analyzing the position of the aeronautical surface using the electronic limiter; and passing the torque error command to the drive circuit only when the position of the aeronautical surface and polarity of the torque error command are such that the torque error command will direct the drive motor to rotate the aeronautical surface toward a position lying within the range.

21. An actuator system that receives an input control signal, the input control signal commanding movement of an aeronautical surface that can move within a range of motion, comprising:

a sensor that provides an electronic indication of torque applied to the aeronautical surface;

an electronic limiter that includes a first rotational position limit that is electrically defined, an electronic comparator that receives the first rotational position limit and compares it with the electronic indication, wherein the electronic comparator provides an electronic output to indicate when movement of the surface causes it to exceed the first rotational position limit, and an electronic circuit that receives the input control signal and modifies the input control signal so that it does not command the surface toward exceeding the first limit, the electronic circuit producing an output control signal; and an electronic drive system that receives the output control signal and moves the aeronautical surface in response to it, the drive system derives a torque error command for each shaft, each torque error command is a difference between the input control signal and the electronic indication;

wherein for each aeronautical surface, the drive circuit rotates the aeronautical surface according to said torque error command; and wherein for each aeronautical surface, the drive circuit rotates the aeronautical surface according to said torque error command only if the response moves the aeronautical surface closer to within said range of motion when said aeronautical surface is not within said range of motion.

22. An actuator system according to claim 21, wherein:

the electronic limiter also includes a second limit that is electronically defined;

the electronic comparator receives both of the first and second limits and compares at least one of them with the indication;

the electronic comparator provides an output indicating when movement of the surface will cause it to exceed the limits; and the electronic circuit modifies the input control signal so that it does not command the surface to move outside of the limits.

23. An actuator system according to claim 22, wherein:

the actuator system further comprises a polarity circuit that receives the input control signal and determines a rotational direction in which the input control signal tries to drive the surface;

the polarity circuit provides a polarity output to the comparator;

the electronic limiter receives the polarity output and prevents the input control signal from commanding the surface to exceed the first limit, in response to a first polarity, and to exceed the second limit, in response to a second polarity.

24. An actuator system according to claim 23, wherein:

the electronic circuit includes two switches, including a first switch controlled in response to comparison of the first limit with the electronic indication, and a second switch controlled in response to comparison of the second limit with the electronic indication;

the first and second switches couple the input control signal to be the output control signal;

the first switch uncouples the input control signal from the output control signal when the surface is to be moved outside the first limit and the input control signal has the first polarity; and the second switch uncouples the input control signal from the output control signal when the surface is to be moved outside the second limit and the input control signal has the second polarity.

25. An actuator system according to claim 23, wherein the sensor includes a position sensor that provides an electronic indication of the rotational position of the aeronautical surface.

26. An actuator system according to claim 25, wherein the input control signal is a torque signal, and wherein:

the system further comprises an output shaft that rotates the aeronautical surface under the control of the drive system;

the polarity circuit processes the torque signal to determine its polarity;

the electronic circuit passes the torque signal to the drive system except when the position sensor indicates that the rotational position of the aeronautical surface exceeds one of the predetermined limits, and the polarity of the torque signal calls for the electronic drive system to rotate the output shaft in a direction away from the exceeded one of the predetermined limits.

27. An actuator system according to claim 26, wherein the position sensor is a potentiometer wiper.

28. An actuator system according to claim 22, wherein the electronic circuit normally couples the input control signal to the output control signal, and is opened to uncouple the input control signal when the surface exceeds one of the limits and input control signal tries to command the surface toward further exceeding said one of the limits.

29. An actuator system according to claim 21, wherein the predetermined limit is set by a voltage divider.

30. An actuator system according to claim 21, wherein the electronic circuit normally couples the input control signal to the output control signal, and is opened to uncouple the input control signal when the surface exceeds the first limit and the input control signal attempts to command the surface toward exceeding the first limit.

31. An actuator system according to claim 21, wherein the input control signal has a first state when the surface is to be rotated clockwise and a second state when the surface is to be rotated counterclockwise, and wherein the electronic drive system is disabled at times when the surface is to be rotated such that its angle exceeds the first limit.

32. An actuator system according to claim 21, wherein the input control signal is a torque command signal, and wherein:

the actuator system further comprises a torque sensor that senses actual rotational torque experienced by the aeronautical surface; and the actuator system further comprises a torque feedback loop that modifies an input torque command, to thereby control the surface using rotational torque feedback from the output shaft.

33. An actuator system according to claim 32, wherein the torque sensor includes a strain gauge that measures rotational strain of the aeronautical surface.

34. An actuator system according to claim 32, wherein the torque sensor includes a magnetostrictive sensor that magnetically measures rotational torque of the output shaft.

35. An actuator system according to claim 34, wherein the magnetostrictive sensor includes a magnetic ring that generates a detectible magnetic field when it undergoes torsional strain.

36. An actuator system according to claim 32, wherein:

the electronic circuit implements the torque feedback loop, to produce a torque error command which the drive system uses to control the angle of the aeronautical surface;

the torque error command has a first state when the surface is to be rotated clockwise and a second state when the surface is to be rotated counterclockwise; and the electronic drive system is disabled at times when the surface is to be rotated such that its angle exceeds the first limit.

\* \* \* \* \*

UNITED STATES PATENT AND TRADEMARK OFFICE
CERTIFICATE OF CORRECTION

PATENT NO. : 5,593,109

DATED : January 14, 1997

INVENTOR(S) : Andrew S. Williams

It is certified that error appears in the above-identified patent and that said Letters Patent is hereby corrected as shown below:

Col. 18, line 19: delete "output shaft" and insert -- aeronautical surface --
Col. 18, line 25: delete "output shaft" and insert -- aeronautical surface --

Signed and Sealed this

Third Day of June, 1997

*Attest:*

BRUCE LEHMAN

*Attesting Officer*   *Commissioner of Patents and Trademarks*